US012570822B2

(12) United States Patent　　(10) Patent No.:　US 12,570,822 B2
Falken　　　　　　　　　　　　　(45) Date of Patent:　　Mar. 10, 2026

(54) RECYCLABLE, BIODEGRADABLE, AND INDUSTRIALLY COMPOSTABLE FOAMS, AND METHODS OF MANUFACTURING THE SAME

(71) Applicant: 02 Partners, LLC, Amherst, MA (US)

(72) Inventor: Robert Falken, Solana Beach, CA (US)

(73) Assignee: 02 PARTNERS, LLC, Amherst, MA (US)

( * ) Notice: Subject to any disclaimer, the term of this patent is extended or adjusted under 35 U.S.C. 154(b) by 0 days.

(21) Appl. No.: 19/017,101

(22) Filed: Jan. 10, 2025

(65) Prior Publication Data

US 2025/0145785 A1　　May 8, 2025

Related U.S. Application Data

(63) Continuation of application No. PCT/US2024/016793, filed on Feb. 22, 2024.

(60) Provisional application No. 63/495,029, filed on Apr. 7, 2023, provisional application No. 63/486,291, filed on Feb. 22, 2023.

(51) Int. Cl.
C08J 9/12　　　　　(2006.01)

(52) U.S. Cl.
CPC ......... C08J 9/122 (2013.01); C08J 2201/032 (2013.01); C08J 2203/06 (2013.01); C08J 2203/08 (2013.01); C08J 2207/00 (2013.01)

(58) Field of Classification Search
CPC .... C08J 9/122; C08J 2207/00; C08J 2203/08; C08J 2203/06; C08J 2201/032
See application file for complete search history.

(56) References Cited

U.S. PATENT DOCUMENTS

| | | |
|---|---|---|
| 4,187,621 A | 2/1980 | Cohen |
| 4,435,346 A | 3/1984 | Ito et al. |
| 5,158,986 A | 10/1992 | Cha et al. |
| 5,334,356 A | 8/1994 | Baldwin et al. |
| 5,437,924 A | 8/1995 | Decker et al. |
| 5,997,781 A | 12/1999 | Nishikawa et al. |
| 6,322,347 B1 | 11/2001 | Xu |
| 6,328,916 B1 | 12/2001 | Nishikawa et al. |
| 6,849,667 B2 | 2/2005 | Haseyama et al. |
| 7,754,325 B2 * | 7/2010 | Toyama .................. C08L 25/06 |
| | | 428/221 |
| 8,362,157 B2 | 1/2013 | Wakaki et al. |
| 8,636,929 B2 | 1/2014 | Sandler et al. |
| 8,937,135 B2 | 1/2015 | Steinke et al. |
| 9,346,204 B2 | 5/2016 | Tokunou |
| 9,610,746 B2 | 4/2017 | Wardlaw et al. |
| 10,005,218 B2 | 6/2018 | Rudolph et al. |
| 10,316,139 B2 | 6/2019 | Bastioli et al. |
| 10,645,992 B2 | 5/2020 | Le et al. |
| 10,730,845 B2 | 8/2020 | Wang et al. |
| 10,759,096 B2 | 9/2020 | Smith et al. |

| | | |
|---|---|---|
| 10,843,429 B2 | 11/2020 | Falken |
| 10,913,189 B2 | 2/2021 | Chen |
| 11,155,009 B2 | 10/2021 | Falken |
| 11,318,647 B2 | 5/2022 | Luo et al. |
| 11,413,799 B2 | 8/2022 | Falken |
| 11,420,367 B2 | 8/2022 | Liu et al. |
| 11,458,657 B2 | 10/2022 | Luo |
| 11,465,377 B2 | 10/2022 | Falken |
| 11,565,448 B2 | 1/2023 | Falken |
| 11,833,724 B2 | 12/2023 | Falken |
| 11,850,775 B2 | 12/2023 | Waggoner et al. |
| 11,912,843 B2 | 2/2024 | Falken |
| 2002/0002208 A1 | 1/2002 | Martel et al. |
| 2002/0193459 A1 | 12/2002 | Haseyama et al. |
| 2003/0116876 A1 | 6/2003 | Wobbe |
| 2004/0038018 A1 | 2/2004 | Anderson et al. |
| 2004/0112996 A1 | 6/2004 | Villwock et al. |
| 2005/0127579 A1 | 6/2005 | Suzuki |
| 2007/0108663 A1 | 5/2007 | Yusa et al. |

(Continued)

FOREIGN PATENT DOCUMENTS

| | | |
|---|---|---|
| BE | 1027200 A1 | 11/2020 |
| CN | 102108116 A | 6/2011 |

(Continued)

OTHER PUBLICATIONS

Machine English translation of CN 108559236, Xi et al., Sep. 21, 2018-09-21.*
Machine English translation of CN 110498939, Guo et al., Nov. 26, 2019.*
International Search Report and Written Opinion for International Application No. PCT/US2024/016793, dated Jul. 15, 2024, 13 pages.
Santiago et al., "Supercritical CO2 Foaming of Thermoplastic Materials Derived from Maize: Proof-of Concept Use in Mammalian Cell Culture Applications" PLOS one. Apr. 10, 2015 (Apr. 10, 2015) p. 1-22.
"Sustainability Report 2019, Consolidated Voluntary Non-Financial Statement Pursuant to Legislative Decree 254/2016," Novamont, retrieved from Internet <https://www.novamont.com/public/Bilancio%20di%20sostenibilit%C3%A0/bds2019_ENG_web_ver2.pdf>.

(Continued)

*Primary Examiner* — Patrick D Niland
(74) *Attorney, Agent, or Firm* — Morgan, Lewis & Bockius LLP

(57)　　　　　　ABSTRACT

A process for producing a flexible foam includes introducing a polymer into an autoclave chamber or mold cavity, pressurizing the autoclave chamber or mold cavity to an elevated pressure using a supercritical fluid, maintaining the elevated pressure within the autoclave chamber or mold cavity for a sufficient time to infuse the supercritical fluid into the polymer, reducing the pressure within the autoclave chamber or mold cavity to cause the infused supercritical fluid to form cell nuclei throughout the polymer, and allowing the cell nuclei to expand to form a foam from the polymer within the autoclave chamber or mold cavity. The polymer is composed of one or more non-cross-linked thermoplastic polymers that are recyclable and/or biodegradable. The polymer may be introduced into the autoclave chamber of mold cavity as a solid sheet or block, or the polymer may be dissolved in a solvent.

28 Claims, 8 Drawing Sheets

(56)　　References Cited

U.S. PATENT DOCUMENTS

| | | |
|---|---|---|
| 2007/0190310 A1 | 8/2007 | Yusa et al. |
| 2008/0050576 A1 | 2/2008 | Pierick et al. |
| 2008/0127527 A1 | 6/2008 | Chen |
| 2009/0270530 A1 | 10/2009 | Nakai et al. |
| 2010/0047550 A1 | 2/2010 | Prissok et al. |
| 2010/0198133 A1 | 8/2010 | Dougherty, Jr. et al. |
| 2010/0230405 A1 | 9/2010 | Strait, III |
| 2010/0242312 A1 | 9/2010 | Lim et al. |
| 2011/0178196 A1 | 7/2011 | Steinke et al. |
| 2011/0263735 A1 | 10/2011 | Bradley |
| 2012/0052143 A1 | 3/2012 | Chen et al. |
| 2012/0061867 A1 | 3/2012 | Dougherty, Jr. et al. |
| 2012/0225961 A1 | 9/2012 | Van Horn et al. |
| 2013/0154143 A1 | 6/2013 | Wallinger et al. |
| 2013/0156833 A1 | 6/2013 | Malet |
| 2013/0203877 A1 | 8/2013 | Uchiyama et al. |
| 2013/0303645 A1 | 11/2013 | Dix et al. |
| 2015/0102528 A1 | 4/2015 | Gunes |
| 2016/0227876 A1 | 8/2016 | Le et al. |
| 2016/0331508 A1* | 11/2016 | Yang ...................... A61L 27/54 |
| 2017/0043503 A1 | 2/2017 | Suzuki |
| 2017/0100861 A1 | 4/2017 | Pawloski et al. |
| 2017/0197342 A1 | 7/2017 | Jacobs |
| 2017/0253710 A1 | 9/2017 | Smith et al. |
| 2018/0236086 A1 | 8/2018 | Garcia Gonzalez et al. |
| 2018/0237605 A1 | 8/2018 | Chang et al. |
| 2018/0273715 A1 | 9/2018 | Luo et al. |
| 2018/0273718 A1 | 9/2018 | Luo et al. |
| 2018/0362721 A1 | 12/2018 | Chang et al. |
| 2018/0368515 A1 | 12/2018 | Yamade et al. |
| 2019/0090581 A1 | 3/2019 | Holmes et al. |
| 2019/0161591 A1 | 5/2019 | Farris et al. |
| 2019/0211203 A1 | 7/2019 | Grechi |
| 2019/0351592 A1 | 11/2019 | Falken |
| 2020/0002498 A1 | 1/2020 | Luo et al. |
| 2020/0002499 A1 | 1/2020 | Luo et al. |
| 2020/0079899 A1 | 3/2020 | Bastioli et al. |
| 2020/0094452 A1 | 3/2020 | Baghdadi et al. |
| 2020/0172661 A1 | 6/2020 | Al-Farhood et al. |
| 2020/0189155 A1 | 6/2020 | Luo et al. |
| 2020/0269535 A1 | 8/2020 | Falken |
| 2020/0385573 A1 | 12/2020 | Jiang |
| 2021/0039346 A1 | 2/2021 | Falken |
| 2021/0101320 A1 | 4/2021 | Lou et al. |
| 2021/0114324 A1 | 4/2021 | Liu et al. |
| 2021/0229326 A1 | 7/2021 | Falken |
| 2021/0229385 A1 | 7/2021 | Falken |
| 2021/0339440 A1 | 11/2021 | Luo et al. |
| 2022/0379528 A1 | 12/2022 | Falken |
| 2023/0038799 A1 | 2/2023 | Falken |
| 2023/0127747 A1 | 4/2023 | Falken |
| 2024/0150540 A1 | 5/2024 | Falken |
| 2024/0166834 A1 | 5/2024 | Liu et al. |
| 2024/0391144 A1 | 11/2024 | Xu et al. |

FOREIGN PATENT DOCUMENTS

| | | | | |
|---|---|---|---|---|
| CN | 102229707 A | | 11/2011 | |
| CN | 203937090 U | | 11/2014 | |
| CN | 206678277 U | | 11/2017 | |
| CN | 108312413 A | | 7/2018 | |
| CN | 108559236 A | * | 9/2018 | ............. A61L 27/18 |
| CN | 110498939 A | * | 11/2019 | ............... C08J 3/28 |
| EP | 1975156 A1 | | 10/2008 | |
| EP | 3103608 A1 | | 12/2016 | |
| EP | 3231836 A1 | | 10/2017 | |
| FR | 3095156 A1 | | 10/2020 | |
| GB | 2358121 A | | 7/2001 | |
| JP | 2001112501 A | | 4/2001 | |
| JP | 2002-363326 A | | 12/2002 | |
| JP | 2011042793 A | | 3/2011 | |
| JP | 2011-168755 A | | 9/2011 | |
| JP | 2012-229416 A | | 11/2012 | |
| TW | 201109148 A | | 3/2011 | |
| WO | 98/31521 A2 | | 7/1998 | |
| WO | WO-03026858 A2 | * | 4/2003 | ............. B29C 48/34 |
| WO | WO-2017066458 A1 | * | 4/2017 | ......... A61B 17/0401 |
| WO | 2019/178154 A1 | | 9/2019 | |

OTHER PUBLICATIONS

Ogunsona, Emmanuel et al. "Characterization and mechanical properties of foamed poly($\varepsilon$-caprolactone) and Mater-Bi blends using $CO_2$ as blowing agent," Journal of Cellular Plastics, published Jul. 22, 2014.

Najafi, Naqi et al. "Rheological and foaming behavior of linear and branched polylactides," Rheol Acta (2014) 53:779-790.

Barrett, Axel. "Mater-Bi® Biopolymers," Bioplastics News, dated Dec. 30, 2013, retrieved from Internet <https://bioplasticsnews.com/2013/12/30/mater-bi-biopolymers/>.

Dippold, Marcel et al. "Influence of pressure-induced temperature drop on the foaming behavior of amorphous polylactide (PLA) during autoclave foaming with supercritical $CO_2$," The Journal of Supercritical Fluids, 190 (2022) 105734.

Lauzon, Michael. "Novamont boosts bio content in polymer," Plastic News, dated Jun. 19, 2013, retrieved from Internet <https://www.plasticsnews.com/article/20130619/NEWS/130619916/novamont-boosts-bio-content-in-polymer>.

Pradeep, Sai Aditya et al. "Investigation of Thermal and Thermomechanical Properties of Biodegradable PLA/PBSA Composites Processed via Supercritical Fluid-Assisted Foam Injection Molding." Polymers 2017, 9, 22.

Marrazzo, Carlo et al. "Foaming of Synthetic and Natural Biodegradable Polymers," Journal of Cellular Plastics, vol. 43, Mar. 2007, pp. 123-133.

* cited by examiner

100

PROVIDE ONE OR MORE PRESELECTED BIODEGRADABLE AND/OR RECYCLABLE MASTERBATCH — 102

MIXING AN INERT CO2 GAS WITH THE PRESELECTED BIODEGRADABLE AND/OR RECYCLABLE MASTERBATCH — 104

EXTRUDING THE SINGLE POLYMER MELT IN ONE OR MORE EXTRUDERS — 106

EXTRUDING SHEETS OF MICROCELLULAR FOAMS — 108

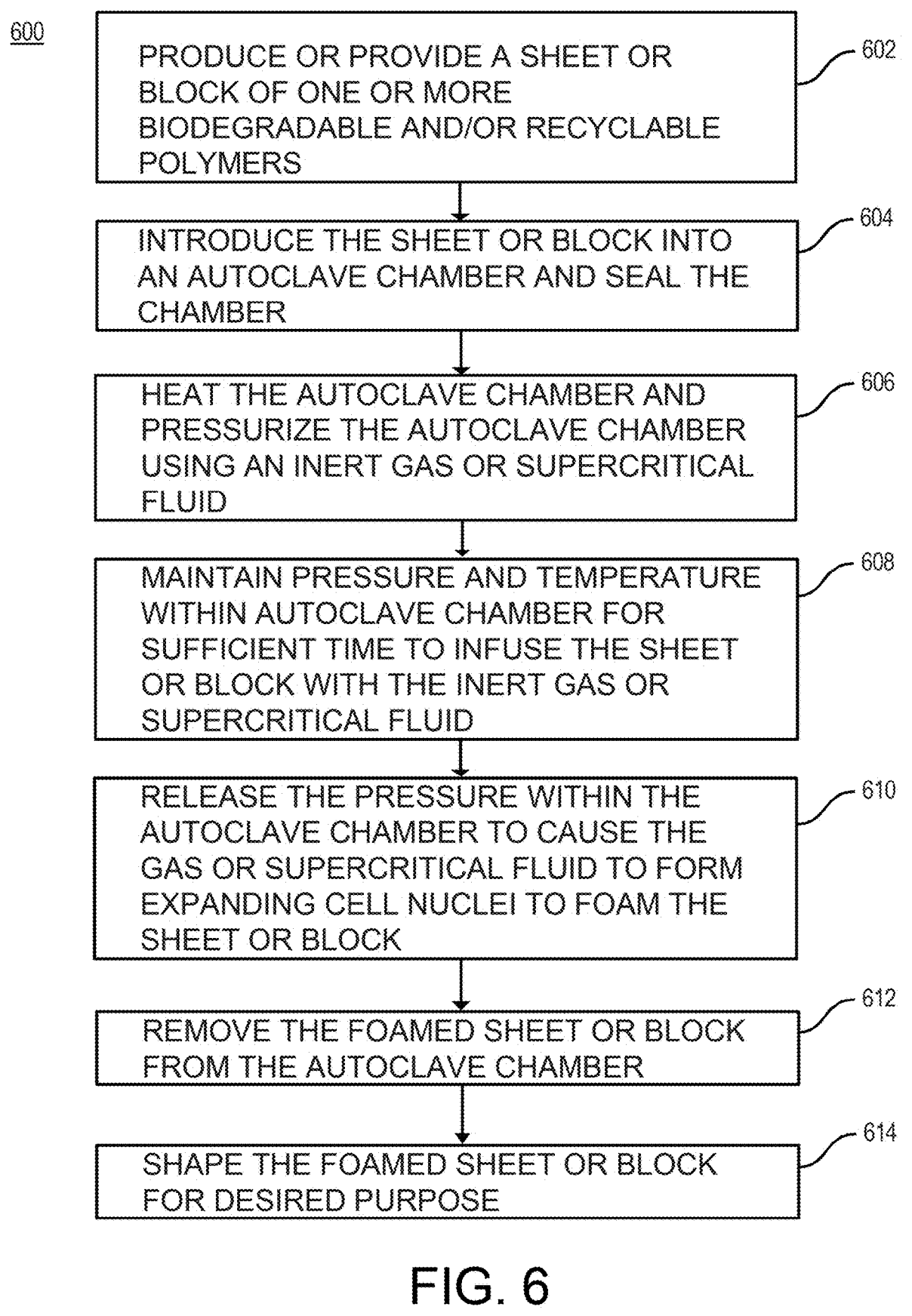

600

| | |
|---|---|
| PRODUCE OR PROVIDE A SHEET OR BLOCK OF ONE OR MORE BIODEGRADABLE AND/OR RECYCLABLE POLYMERS | 602 |

↓

| | |
|---|---|
| INTRODUCE THE SHEET OR BLOCK INTO AN AUTOCLAVE CHAMBER AND SEAL THE CHAMBER | 604 |

↓

| | |
|---|---|
| HEAT THE AUTOCLAVE CHAMBER AND PRESSURIZE THE AUTOCLAVE CHAMBER USING AN INERT GAS OR SUPERCRITICAL FLUID | 606 |

↓

| | |
|---|---|
| MAINTAIN PRESSURE AND TEMPERATURE WITHIN AUTOCLAVE CHAMBER FOR SUFFICIENT TIME TO INFUSE THE SHEET OR BLOCK WITH THE INERT GAS OR SUPERCRITICAL FLUID | 608 |

↓

| | |
|---|---|
| RELEASE THE PRESSURE WITHIN THE AUTOCLAVE CHAMBER TO CAUSE THE GAS OR SUPERCRITICAL FLUID TO FORM EXPANDING CELL NUCLEI TO FOAM THE SHEET OR BLOCK | 610 |

↓

| | |
|---|---|
| REMOVE THE FOAMED SHEET OR BLOCK FROM THE AUTOCLAVE CHAMBER | 612 |

↓

| | |
|---|---|
| SHAPE THE FOAMED SHEET OR BLOCK FOR DESIRED PURPOSE | 614 |

FIG. 6

RECYCLABLE, BIODEGRADABLE, AND INDUSTRIALLY COMPOSTABLE FOAMS, AND METHODS OF MANUFACTURING THE SAME

CROSS REFERENCE TO RELATED APPLICATIONS

This application is a continuation of International Patent Application No. PCT/US2024/016793, filed Feb. 22, 2024, which in turn claims priority to and the benefit of U.S. Patent Application No. 63/486,291, filed Feb. 22, 2023, and U.S. Patent Application No. 63/495,029, filed Apr. 7, 2023, each of which is incorporated herein by reference in its entirety.

FIELD OF THE INVENTION

The present disclosure, according to some embodiments, relates to processes for forming flexible foams from recycled, recyclable, biodegradable, bio-derived, and/or industrially compostable materials. In some embodiments, the present disclosure provides an extrusion process for forming the flexible foams. In some embodiments, the present disclosure provides an autoclave process for forming the flexible foams. Foams manufactured in accordance with embodiments of the present disclosure may be useful in a variety of industries and end products, for example, but not limited to, footwear components, seating components, protective gear components, vehicle components, bedding, and watersport accessories.

BACKGROUND

Flexible foams are a type of object formed by trapping pockets of gas in a liquid or solid whereby the resulting foam is said to be flexible due in part to its malleability. Flexible foams are typically used in cushioning applications, for example, footwear, furniture, bedding, and other sporting goods. Flexible foams typically fall into two categories: closed-cell flexible thermoplastic polymer foams and open-cell flexible polyurethane foams. Each of these foam types have very different manufacturing methods.

Closed-cell flexible thermoplastic polymer foams are commonly produced in a dry process in which a suitable synthetic polymer is selected and blended with various chemical additives, crosslinking agents, and chemical blowing agents for producing a "dough." The dough is then kneaded and extruded into flat sheets. The sheets are then stacked on top of each other and placed in a heated press under controlled pressure. This mixture of materials and the chemical blowing agent react and expand inside of the heated press cavity. The result is a closed-cell flexible foam "bun" or "block" that is then slices to thickness. By contrast, open-cell flexible polyurethane foams are commonly produced in a liquid pouring process or liquid molding process in which a man-made polyol chemical, isocyanate chemical, and other chemical additives, are reacted together while being poured or injected into a molded shape, such as a "bun" or "block." The result is an open-cell flexible foam that is then sliced to thickness.

A problem with the presently available flexible foams in the market today is that these foams almost exclusively use non-recyclable and non-compostable materials, and/or environmentally harmful chemicals in their manufacture. Furthermore, due in part to the chemical crosslinking that takes place in the above-described methods of manufacturing conventional flexible foams, the physical structure of those flexible foams cannot be readily recycled or composted. This is due in large part to the chemical compositions of the foam's design and their inability to be separated back into their root precursor constituents. That is, at the end of the conventional flexible foam's life the foam has no further use and cannot be reprocessed into new materials successfully in any known commercially viable methods.

SUMMARY

The present disclosure, according to some embodiments, provides flexible foams and manufacturing processes that may be employed to produce end products that are recyclable, biodegradable, compostable, sustainable, and/or environmentally accountable. In some embodiments, the foam materials and end products are capable of both sustained use, without breakdown, yet are readily recyclable and/or compostable after end of life.

An object of the manufacturing processes disclosed herein, as compared to the more traditional manufacturing processes, is that the manufacturing processes result in environmentally thoughtful end products. By selecting recycled and/or recyclable or biodegradable and industrially compostable feedstocks for producing polymers, embodiments of the present disclosure can contribute to the so-called circular economy and significantly reduce the waste that ends up in landfills every year. In certain preferred embodiments, the flexible foams are derived from recycled materials as well as being recyclable at the end of their usable life. To that end, the selection of environmentally sustainable materials used in the manufacture of said end products should be carefully considered and balanced against the intended performance and useable-life of the end product.

For example, running shoes are highly technical products that are exposed to repeated abuses, including: impact, abrasion, and all manners of environmental exposures over considerable amounts of time, perhaps 1-3 years depending on the frequency of use. When selecting sustainable materials for the use in manufacturing of soles, midsoles, and/or cushioning for insoles of running shoes, it is important to consider the above factors. A material that cannot handle repeated abuse before failure would not produce a satisfactory pair of running shoes. Additionally, any material that has the potential to break-down or weaken to the point of failure during regular product use, prior to the intended end-of-life, would not be acceptable.

In order to address this problem, embodiments of the present disclosure utilize particular materials that provide a balance of technical performance properties as well as sustainability aspects. These sustainability aspects include, for example, properties such as recyclability or composability with a managed end-of-life solution. In some embodiments, the materials used in the present disclosure are net-neutral (or negative) with respect to harmful emissions. End products including the recyclable or compostable flexible foams made in accordance with embodiments of the present disclosure should function very well for the useable life of the product, and only at the end of the products useable life, would the materials have the option to be directed into recycling or compost settings for "closed loop" waste diversion.

In certain embodiments, a process for producing a flexible foam includes introducing a masterbatch material into an extruder, the masterbatch material consisting essentially of one or more thermoplastic polymers that are recycled, recyclable, biodegradable, and/or compostable, mixing an inert gas with the masterbatch material, extruding the masterbatch material through the extruder to form a polymer melt, passing the polymer melt through a die to form an extrudate, and allowing the extrudate to expand into a foam. In some embodiments, the inert gas is nitrogen. In other embodiments, the inert gas is carbon dioxide.

In some embodiments, the one or more thermoplastic polymers is a polyamide or a polyamide copolymer. In some embodiments, the one or more thermoplastic polymers is a polyamide selected from the group consisting of: polyether block amide (PEBA), polyamide 6, polyamide 6/6-6, polyamide 12, or a blend containing one or more thereof. In some embodiments, the one or more thermoplastic polymers comprises a polyesters or a polyester copolymer. In some embodiments, the one or more thermoplastic polymers is a polyester selected from the group consisting of: polybutylene adipate terephthalate (PBAT), polylactic acid (PLA), poly(L-lactic acid) (PLLA), poly(butylene adipate-co-terephthalate) (PBAT), polycaprolactone (PCL), polyhydroxy alkanoate (PHA), polyhydroxybutyrate (PHB), polybutylene succinate (PBS), polybutylene succinate adipate (PBSA), polybutylene adipate (PBA), thermoplastic starch (TPS), and a blend containing one or more thereof. In some embodiments, the one or more thermoplastic polymers is or includes one or more recycled polymer materials. In some embodiments, the one or more thermoplastic polymers comprises of one or more bio-derived polymers (e.g., a bio-derived PBAT).

In some embodiments, the inert gas is mixed with the masterbatch material as a supercritical fluid. In some embodiments, the masterbatch material and the supercritical fluid are mixed to form a single-phase solution. In other embodiments, the inert gas is mixed with the masterbatch material prior to introducing the masterbatch material into the extruder. In some embodiments, the masterbatch material includes pellets of the one or more thermoplastic polymers, and mixing the inert gas with the masterbatch material includes infusing the inert gas into the pellets of the one or more thermoplastic polymers. In some embodiments, infusing the inert gas into the pellets of the one or more thermoplastic polymers causes the pellets of the one or more thermoplastic polymers to expand. In some embodiments, introducing the masterbatch material into the extruder includes introducing the expanded pellets of the one or more thermoplastic polymers into the extruder. In some embodiments, extruding the masterbatch material through the extruder to form a polymer melt includes fusing the expanded pellets of the one or more thermoplastic polymers.

In some embodiments, a process for producing a flexible foam includes providing a plurality of pellets comprising one or more thermoplastic polymers that are recyclable, biodegradable, and/or industrially compostable; expanding the pellets of the one or more thermoplastic polymers by infusing an inert gas into the pellets; introducing the expanded pellets into an extruder; fusing the expanded pellets in the extruder; and extruding the fused expanded pellets through a die using the extruder. In some embodiments, the one or more thermoplastic polymers is or includes a polymer selected from the group consisting of: polybutylene adipate terephthalate (PBAT), polylactic acid (PLA), poly(L-lactic acid) (PLLA), poly(butylene adipate-co-terephthalate) (PBAT), polycaprolactone (PCL), polyhydroxy alkanoate (PHA), polyhydroxybutyrate (PHB), polybutylene succinate (PBS), polybutylene succinate adipate (PBSA), polybutylene adipate (PBA), thermoplastic starch (TPS), and a blend containing one or more thereof. In some embodiments, the one or more thermoplastic polymers is or includes PBAT, PHA, and/or PHB. In some embodiments, the one or more thermoplastic polymers comprises of one or more bio-derived polymers. In some embodiments, the one or more thermoplastic polymers is a recyclable polymer. The inert gas may be, for example, nitrogen or carbon dioxide. In some embodiments, the inert gas is infused in the pellets at saturation pressures ranging from 75 bar to 200 bar, for example, 90 bar to 150 bar. In some embodiments, the inert gas is infused in the pellets at temperatures ranging from 90° C. to 200° C.

In some embodiments, a process for producing a flexible foam includes introducing a polymer into an autoclave chamber, pressurizing the autoclave chamber to an elevated pressure using a supercritical fluid, maintaining the elevated pressure within the autoclave chamber for sufficient time to infuse the supercritical fluid into the polymer, reducing the pressure within the autoclave chamber to cause the infused supercritical fluid to form cell nuclei throughout the polymer, and allowing the cell nuclei to expand to form a foam from the polymer within the autoclave chamber. The polymer is composed of one or more non-cross-linked thermoplastic polymers that are recyclable and/or biodegradable as described herein. The polymer may be introduced into the autoclave as a sheet or block. Alternatively, the polymer may be dissolved in an organic solvent and introduced into the autoclave in a liquid solution.

In some embodiments, a process for producing a foam includes introducing a polymer sheet or block into an autoclave chamber, pressurizing the autoclave chamber to an elevated pressure using a supercritical fluid, maintaining the elevated pressure within the autoclave chamber for sufficient time to infuse the supercritical fluid into the polymer sheet or block, reducing the pressure within the autoclave chamber to cause the infused supercritical fluid to form cell nuclei throughout the polymer sheet or block, and allowing the cell nuclei to expand to form a foam from the polymer sheet or block within the autoclave chamber. In some embodiments, the polymer sheet or block includes one or more non-cross-linked thermoplastic polymers that are recyclable and/or biodegradable.

In some embodiments, the process for producing the foam further includes a step of producing the polymer sheet or block by an extrusion process prior to introducing the polymer sheet or block into the autoclave chamber. In some embodiments, the extrusion process includes feeding pellets of the one or more non-cross-linked thermoplastic polymers into an extruder, compressing and melting the pellets in the extruder to form a polymer melt, and extruding the polymer melt through a die. The extrusion process may also include cooling the polymer melt after the polymer melt exits the die for form a solid polymer extrudate and cutting the solid polymer extrudate for form the polymer sheet or block. In some embodiments, the extrusion process further includes passing the solid polymer extrudate between rollers to flatten the solid polymer extrudate prior to cutting the solid polymer extrudate.

In some embodiments, the process for producing the foam further includes producing the polymer sheet or block by an injection molding process prior to introducing the polymer sheet or block into the autoclave chamber. In some embodiments, the injection molding process includes, for example, forming a molten polymer from pellets of the one or more non-cross-linked thermoplastic polymers, injecting the molten polymer into a mold having a predetermined shape and size, and cooling the molten polymer to solidify the polymer into the polymer sheet or block having the shape and size of the mold. In some embodiments, the predetermined shape of the mold is a shape of a shoe component, for example, a shoe midsole or insole. In some embodiments, the foam has dimensions that are from about 2 to about 3 times the dimensions of the polymer sheet or block (e.g, 2.6 to 2.8 times).

In other embodiments, a process for producing a foam includes dissolving a polymer masterbatch comprising one or more non-cross-linked thermoplastic polymers that are recyclable and/or biodegradable in a solvent to form a solution, introducing the solution into an autoclave chamber, pressurizing the autoclave chamber to an elevated pressure using a supercritical fluid, maintaining the elevated pressure within the autoclave chamber for sufficient time to dissolve the supercritical fluid into the solution, reducing the pressure within the autoclave chamber to cause the supercritical fluid to form cell nuclei in the solution and cause the solvent to vaporize from the solution, and allowing the cell nuclei to expand to form a foam from the solution within the autoclave chamber. The solvent may be an organic solvent. In some embodiments, the foam may be washed to remove residual solvent from the foam and drying the foam after washing.

In some embodiments, the processes utilizing an autoclave chamber further includes heating the autoclave chamber during pressurizing the autoclave chamber. In some embodiments, the autoclave chamber is heated above the critical temperature of the supercritical fluid, and the autoclave chamber is pressurized above the critical pressure of the supercritical fluid. In some embodiments, pressurizing the autoclave chamber to the elevated pressure using a supercritical fluid includes introducing a sufficient amount of the supercritical fluid into the autoclave chamber to obtain the elevated pressure. In some embodiments, pressurizing the autoclave chamber to the elevated pressure using a supercritical fluid includes introducing an inert gas into the autoclave chamber and converting the inert gas into a supercritical fluid in the autoclave chamber. The supercritical fluid may be supercritical $CO_2$, supercritical $N_2$, or a mixture of the two, for example.

In some embodiments, the pressure within the autoclave chamber is elevated to at least 100 bar (10 MPa), at least 125 bar (12.5 MPa), at least 150 bar (15 Mpa), at least 175 bar (17.5 MPa), or at least 200 bar (20 MPa). For example, the pressure within the autoclave chamber may be elevated to about 180 bar (18 MPa) to about 200 bar (20 MPa). In some embodiments, the temperature within the autoclave chamber is elevated to at least 75° C., at least 80° C., at least 85° C., at least 90° C., at least 95° C., at least 100° C., at least 105° C., at least 110° C., at least 115° C., at least 120° C., or at least 125° C. In some embodiments, for example, the temperature within the autoclave chamber is elevated to about 95° C. to about 115° C. In some embodiments, the elevated pressure and temperature is maintained in the autoclave chamber (e.g., hold time) for greater than thirty minutes, greater than sixty minutes, at least 120 minutes, or at least 180 minutes, at least 240 minutes, at least 300 minutes, or at least 360 minutes to infuse the polymer sheet or block with the supercritical fluid. In other embodiments, the hold time may be less than 15 minutes, less than 10 minutes, or less than five minutes. In some embodiments, the hold time is between one minute and five minutes, between one minute and 10 minutes, between one minute and 15 minutes, between one minute and 30 minutes, or between one minute and 60 minutes. In some embodiments, the hold time is between 60 minutes to 120 minutes. In some embodiments, the hold time is between 120 minutes to 180 minutes. In some embodiments, the hold time is between 180 minutes to 240 minutes. In some embodiments, the hold time is between 240 minutes to 300 minutes. In some embodiments, the hold time is between 300 minutes to 360 minutes.

In some embodiments, a further process for producing a foam includes placing a polymer sheet or block into a mold cavity, the polymer sheet or block comprising one or more non-cross-linked thermoplastic polymers that are recyclable and/or biodegradable, closing and sealing the mold cavity, heating the mold cavity to a predetermined temperature, introducing a sufficient amount of supercritical fluid into the mold cavity to pressurize the mold cavity, allowing the supercritical fluid to diffuse into the polymer sheet or block for a predetermined amount of time, and, after the predetermined amount of time, releasing the pressure inside the mold cavity to expand the polymer sheet or block inside the mold cavity. In some embodiments, the polymer sheet or block expands to substantially or entirely fill the mold cavity. In some embodiments, the predetermined amount of time is sufficient for the diffusion of the supercritical gas into solid polymer sheet or block to reach equilibrium. In some embodiments, the predetermined temperature greater than the critical temperature of the supercritical gas. In some embodiments, the polymer sheet or block is an extruded polymer sheet or block. In some embodiments, the process includes producing the polymer sheet or block by an extrusion process prior to placing the polymer sheet or block into the mold cavity. In still further embodiments, the process includes cooling the mold cavity prior to or simultaneously with releasing the pressure inside the mold cavity.

In some embodiments, the one or more non-cross-linked thermoplastic polymers comprises one or more polymers derived from a recycled feedstock. In some embodiments, the one or more non-cross-linked thermoplastic polymers comprises a polyamide or a polyamide copolymer. In some embodiments, the one or more non-cross-linked thermoplastic polymers comprises a polymer selected from the group consisting of: polyether block amide (PEBA), polyamide 6, polyamide 6/6-6, polyamide 12, or a blend containing one or more thereof.

In some embodiments, the one or more non-cross-linked thermoplastic polymers are selected to be completely biodegradable and/or industrially compostable. In some embodiments, the one or more non-cross-linked thermoplastic polymers comprises a polymer selected from the group consisting of: polybutylene adipate terephthalate (PBAT), polylactic acid (PLA), poly(L-lactic acid) (PLLA), poly (butylene adipate-co-terephthalate) (PBAT), polycaprolactone (PCL), polyhydroxy alkanoate (PHA), polyhydroxybutyrate (PHB), polybutylene succinate (PBS), polybutylene succinate adipate (PBSA), polybutylene adipate (PBA), thermoplastic starch (TPS), and a blend containing one or more thereof. In some embodiments, the one or more non-cross-linked thermoplastic polymers comprises poly (butylene adipate-co-terephthalate) (PBAT). In some embodiments, the one or more non-cross-linked thermoplastic polymers consists only of poly(butylene adipate-co-terephthalate) (PBAT). In some embodiments, the one or more non-cross-linked thermoplastic polymers comprises a bio-derived polymer, for example, a bio-derived polyester. In some embodiments, the one or more non-cross-linked thermoplastic polymers comprises a branched polyester.

In some embodiments, the one or more non-cross-linked thermoplastic polymers comprises one or more aliphatic-aromatic polyesters selected from the group consisting of: poly(1,4-butylene adipate-co-1,4-butylene terephthalate), poly(1,4-butylene sebacate-co-1,4-butylene terephthalate), poly(1,4-butylene azelate-co-1,4-butylene terephthalate), poly(1,4-butylene brassylate-co-1,4-butylene terephthalate), poly(1,4-butylene succinate-co-1,4-butylene terephthalate), poly(1,4-butylene adipate-co-1,4-butylene sebacate-co-1,4-butylene terephthalate), poly(1,4-butylene azelate-co-1,4-butylene sebacate-co-1,4-butylene terephthalate), poly(1,4-butylene adipate-co-1,4-butylene azelate-co-1,4-butylene terephthalate), poly(1,4-butylene succinate-co-1,4-butylene sebacate-co-1,4-butylene terephthalate), poly(1,4-butylene adipate-co-1,4-butylene succinate-co-1,4-butylene terephthalate), poly(1,4-butylene azelate-co-1,4-butylene succinate-co-1,4-butylene terephthalate), poly(1,4-butylene azelate-co-1,4-butylene succinate-co-1,4-butylene adipate-co-1,4-butylene terephthalate), poly(1,4-butylene azelate-co-1,4-butylene succinate-co-1,4-butylene sebacate-co-1,4-butylene terephthalate), poly(1,4-butylene azelate-co-1,4-butylene succinate-co-1,4-butylene brassylate-co-1,4-butylene terephthalate), poly(1,4-butylene azelate-co-1,4-butylene succinate-co-1,4-butylene adipate-co-1,4-butylene sebacate-co-1,4-butylene terephthalate), poly(1,4-butylene azelate-co-1,4-butylene succinate-co-1,4-butylene adipate-co-1,4-butylene brassylate-co-1,4-butylene terephthalate), poly(1,4-butylene azelate-co-1,4-butylene succinate-co-1,4-butylene brassylate-co-1,4-butylene sebacate-co-1,4-butylene terephthalate), poly(1,4-butylene azelate-co-1,4-butylene succinate-co-1,4-butylene adipate-co-1,4-butylene sebacate-co-1,4-butylene brassylate-co-1,4-butylene terephthalate), and mixtures thereof. The one or more aliphatic-aromatic polyesters may each be bio-derived polyesters that are preferably biodegradable.

In some embodiments, foams made in accordance with processes described herein are recyclable, biodegradable, and/or compostable. The foams are preferably microcellular flexible foams that may be used in place of conventional cross-linked flexible foams. Methods of producing foams according to certain preferred embodiments do not include any chemical cross-linking processes or steps. In some embodiments, the foams do not include any cross-linking agents. In some embodiments, the foams do not include any cross-linking or cross-linking agents that would prevent the foams from being recycled or biodegraded. A cross-link is a bond or a short sequence of bonds that links one polymer chain to another. Such bonds, when present, can prevent a polymer material from being readily recycled and/or biodegraded. Accordingly, the polymers used in embodiments described herein are preferably not cross-linked (also referred to as "non-cross-linked" or "uncross-linked"). A non-cross-linked foam according to some embodiments should therefore not contain or be formed from cross-linked polymers. In further embodiments, foams made in accordance with processes described herein may be shaped and used in the manufacture of various articles, for example, but not limited to, footwear components (e.g., shoe insoles or midsoles), seating components (e.g., seat cushioning), protective gear components (e.g., padding), vehicle components, bedding components, watersport accessories, or other end products that include foam components.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention can be embodied in different forms and thus should not be construed as being limited to the embodiments set forth herein. The appended drawings may not be drawn to scale.

FIG. 6 is a flow chart of a second process for forming flexible foams using an autoclave according to further embodiments of the present disclosure;

DETAILED DESCRIPTION

Figure 1:
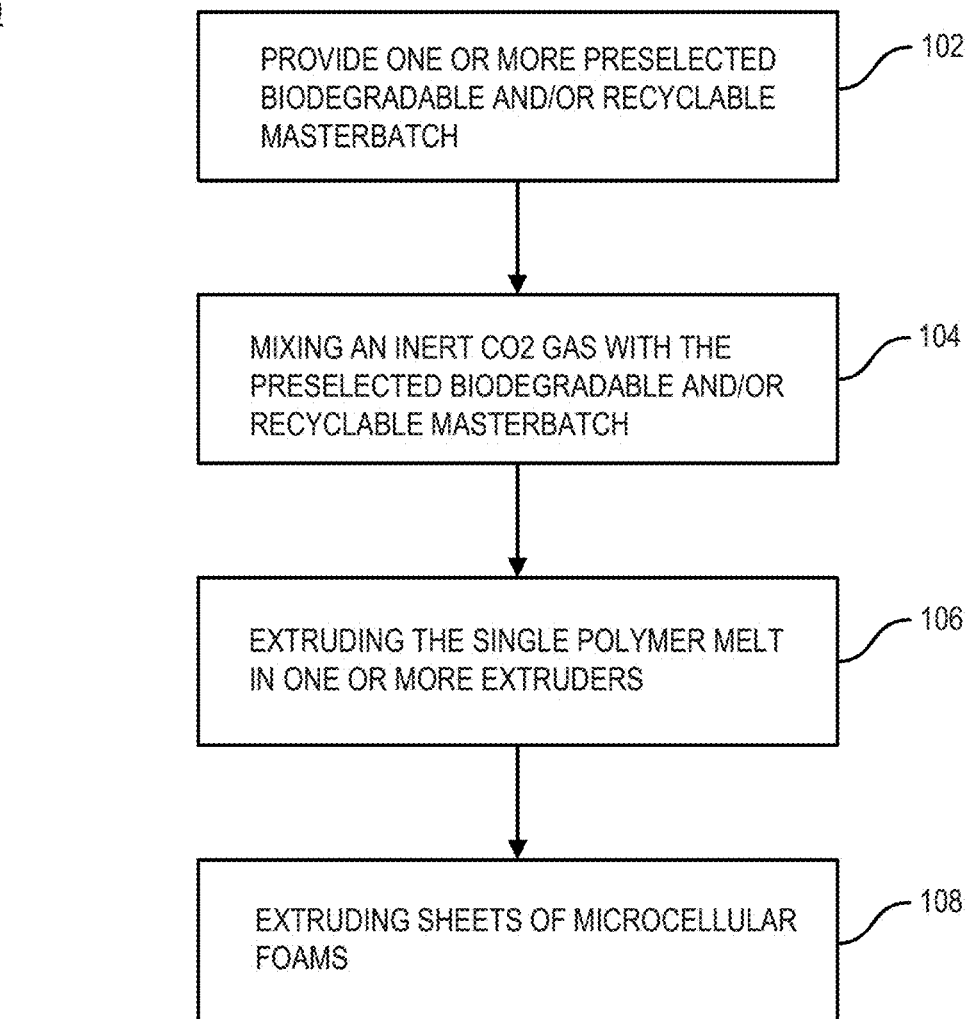
FIG. 1 is a flow chart of a process for forming extruded flexible foams according to some embodiments of the present disclosure.

The present disclosure, in some embodiments, provides recyclable, biodegradable, and/or industrially compostable flexible foams and methods of manufacturing the same. Foams according to embodiments of the present disclosure may be closed-cell foams. In other embodiments, foams of the present disclosure may be open-cell foams. In some embodiments, the foams produced according to methods of the present disclosure are microcellular flexible foams that are useful in a variety of products in place of conventional ethylene vinyl acetate or polyurethane foams. In various embodiments, a recyclable, biodegradable, and/or industrially compostable flexible foams can be made to have similar properties and performance characteristics of conventional non-recyclable ethylene vinyl acetate (EVA) foam or thermoplastic polyurethane (TPU), yet contain a high percentage of recycled or bio-derived content. Foams manufactured in accordance with embodiments of the present disclosure may be useful in a variety of industries and end products, for example, but not limited to, footwear components, seating components, protective gear components, vehicle components, bedding, and watersport accessories.

As used herein, "biodegradable" generally refers to a capability of being decomposed by biological activity, in particular, by microorganisms. In some embodiments, materials and foams described in the present disclosure as being biodegradable and/or industrially compostable meet or exceed the requirements set forth in at least one of the following standards: European Standard EN 13432, ASTM D6400, or Australian Standard AS 4736. In some embodiments, materials and foams described in the present disclosure as being biodegradable and/or industrially compostable meet or exceed the requirements set forth in at least European Standard EN 13432. In some embodiments, materials and foams described in the present disclosure as being industrially compostable are configured to demonstrate at least 60% biodegradation (at least 60% of the materials have to be broken down by biological activity) within 180 days of composting in a commercial composting unit. In some embodiments, materials and foams described in the present disclosure as being industrially compostable are configured to demonstrate at least 90% biodegradation within 180 days of composting in a commercial composting unit.

In some embodiments, the term "recyclable" may generally refer to the ability of a material or product to be collected, separated, or otherwise recovered from the waste stream for reuse or use in manufacturing or assembling another item. In some embodiments, polymers and foams described in the present disclosure as being recyclable refers to the ability of the constituent materials to be recovered, for example, by mechanical recycling, chemical recycling, and/or biological or organic recycling. In some embodiments, polymers and foams described in the present disclosure as being recyclable refers to the ability to depolymerize the polymers and foams, for example, to recover constituent monomers that form the polymers and foams. In some embodiments, polymers and foams described in the present disclosure as being recyclable refers to the ability of the constituent materials to be recovered using standard plastic recycling methods, for example, as set forth in ISO 15270: 2008. In some embodiments, recycled materials, foams, and/or products described herein may be produced in accordance with the requirements set forth in the Textile Exchange Recycled Claim Standard 2.0 (RCS, Jul. 1, 2017) and/or the Textile Exchange Global Recycle Standard 4.0 (GRS, Jul. 1, 2017).

In some embodiments, a process for forming an extruded flexible foam according to the present disclosure generally includes the steps of: introducing a polymer pellets into an extruder, melting the polymer pellets in the extruder to form a polymer melt, and extruding the polymer melt through a die to form an extrudate. In some embodiments, a foaming agent is introduced into the extruder and allowed to mix with the polymer melt. In some embodiments, the foaming agent is introduced as a supercritical fluid and forms a single-phase solution with the polymer melt. In other embodiments, the polymer pellets are saturated with a blowing agent prior to introducing the polymer pellets into the extruder. As will be described further herein, the polymer pellets are preferably composed of one or more thermoplastic polymers that are recyclable, biodegradable, and/or industrially compostable. In some embodiments, the polymer pellets are composed of a bio-derived thermoplastic polymer. In some embodiments, the polymer pellets are made from recycled plastic materials.

FIG. 1 a flow chart of a process 100 for forming extruded flexible foams in accordance with certain exemplary embodiments of the present disclosure. At step 102, in some embodiments, process 100 includes providing a masterbatch of one or more preselected materials. The masterbatch, in some embodiments, is composed of a thermoplastic polymer material in the form of pellets, granules, or the like. As noted above, the one or more preselected materials is preferably one or more thermoplastic polymers that are recyclable, biodegradable, and/or industrially compostable according to some embodiments. In some embodiments the one or more preselected materials is derived from recycled plastic waste materials. In some embodiments, the masterbatch consists entirely of one or more preselected biodegradable materials (e.g., biodegradable thermoplastic polymers). In some embodiments, the masterbatch consists entirely of one or more preselected recyclable materials (e.g., recyclable thermoplastic polymers).

At step 104 of process 100, an inert gas is mixed with the masterbatch. In some embodiments, the inert gas (e.g., a foaming agent) is mixed with the masterbatch in one or more extruders. The inert gas may be mixed with the masterbatch as a supercritical fluid in some embodiments. In some embodiments, the masterbatch is melted and forms a single-phase solution with the supercritical fluid. In other embodiments, the masterbatch is saturated with an inert gas (e.g., a blowing agent) before introducing the masterbatch into the one or more extruders.

In some embodiments, saturating the pellets of the masterbatch with the inert gas infuses the pellets with a portion of the gas, and causes the pellets to at least partially expand. In some embodiments, saturating the masterbatch with the inert gas forms puffed (expanded) or at least partially puffed polymer pellets which can then be fused together (e.g., via extrusion). In some embodiments, puffed (expanded) polymer pellets have a size from 4 mm to 10 mm (e.g., in a broadest dimension). In some embodiments, the puffed (expanded) polymer pellets have a bulk density from about 100 kg/m$^3$ to about 200 kg/m$^3$. In some embodiments, the polymer pellets have an expansion ratio in the range of about 1.5 to about 4.5. In some embodiments, the inert gas saturation pressures can range from 75 bar to 200 bar, for example, 90 bar to 150 bar. In some embodiments, the inert gas saturation temperatures can range from 90° C. to 200° C., depending on the specific biodegradable, industrially compostable, and/or recycled and/or recyclable polymers drop point and melt temperatures. Furthermore, in some embodiments, the mean pore size and cell density of the foam is controllable to a certain degree with the adjustment of the saturation pressure. In some embodiments, a high inert gas saturation pressure is preferred for obtaining small mean pore size and high cell density. In yet further embodiments, the polymers may be optionally pre-dried and dehumidified prior to foaming. In some embodiments, for example, pre-drying conditions are in the range of 65-85° C. for 4-6 hours with a dew point of −40° C. and less than 0.05% relative humidity.

At step 106, the masterbatch, mixed with the gas, forms a polymer melt that is extruded through the one or more extruders. The one or more extruders may be, for example, screw extruders having one or more extrusion screws for compressing and conveying the polymer melt. At step 108, the polymer melt is extruded into sheets of microcellular foams. In some embodiments, the polymer melt is extruded through a die configured to shape the extrudate. In some embodiments, as the polymer melt is extruded through the die, the gas mixed within the polymer melt is allowed to expand, resulting in a flexible foam. In further embodiments, the flexible foam can then be cut and/or shaped (e.g., via compression molding) into any desired configuration.

The present subject matter will now be described more fully hereinafter in which representative embodiments are described. The present subject matter can, however, be embodied in different forms and should not be construed as being limited to the specific embodiments set forth herein. Rather, these embodiments are provided to describe and enable one of skill in the art.

Thermoplastic Polymers

In some embodiments, creating microcellular extrusion foams from recycled and/or recyclable thermoplastic polymers or, alternatively, bio-derived thermoplastic polymers begins with selecting a suitable high-performance polymer. Suitable thermoplastic polymers that may be utilized according to embodiments of the present disclosure should preferably include the following characteristics: produces foams with low density, has moderate melt flow rates, produces high elongation when foamed, and is 100% recyclable and/or 100% industrial compostable. In some non-limiting examples, a suitable thermoplastic polymer will produce a foam having a density from 0.15 g/cc to 0.35 g/cc, preferably from 0.20 g/cc to 0.25 g/cc. In some non-limiting examples, a suitable thermoplastic polymer will have a melt flow rate ranging from 5 g/10 min to 30 g/10 min, preferably 10 g/10 min to 20 g/10 min. In other examples, the melt flow rate may range from 7 g/10 min to 15 g/10 min. In some non-limiting examples, a suitable thermoplastic polymer produces foamed elongation ranging from 150% to 800%, preferably from 250% to 450%. In some embodiments, the thermoplastic polymer may be supplied in the form of solid pellets that are sized and configured to be fed into an extruder. The plurality of pellets of the polymer material to be fed into the extruder may also be referred to herein as a "masterbatch." In certain preferred embodiments, the polymer material selected for the pellets is not cross-linked.

In some embodiments, a thermoplastic polymer used to manufacture the recyclable, biodegradable, and/or industrially compostable flexible foams of the present disclosure can be selected from any number of polyamides or polyamide copolymers. Non-limiting examples of suitable polyamide polymers include polyether block amide (PEBA), polyamide 6, polyamide 6/6-6, polyamide 12, and blends containing one or more thereof. A non-limiting example of a suitable recycled and/or recyclable polymer is a PEBA manufactured by Nylon Corporation of America, Manchester, NH.

In some embodiments, a thermoplastic polymer used to manufacture the recyclable, biodegradable, and/or industrially compostable flexible foams of the present disclosure can be selected from any number of polyesters including polyester copolymers, preferably a bio-derived polyester. In some embodiments, the thermoplastic polymer is or includes a branched polyester. Non-limiting examples suitable polymers include polybutylene adipate terephthalate (PBAT), polylactic acid (PLA), poly(L-lactic acid) (PLLA), poly (butylene adipate-co-terephthalate) (PBAT), polycaprolactone (PCL), polyhydroxy alkanoate (PHA), polyhydroxybutyrate (PHB) polybutylene succinate (PBS), polybutylene succinate adipate (PBSA), polybutylene adipate (PBA), thermoplastic starch (TPS), and blends containing one or more thereof. In some embodiments, the thermoplastic polymer selected for the recyclable, biodegradable, and/or industrially compostable flexible foams of the present disclosure includes or consists entirely of PBAT. In some embodiments, the thermoplastic polymer selected for the recyclable, biodegradable, and/or industrially compostable flexible foams of the present disclosure includes or consists entirely of PHA.

In some embodiments, the thermoplastic polymer used to produce foams of the present disclosure includes a biodegradable polyester. In some embodiments, the biodegradable polyester is a branched polyester. In some embodiments, the biodegradable polyester is chosen from aliphatic and aliphatic-aromatic biodegradable polyesters. In some embodiments, the biodegradable polyester is an aliphatic-aromatic polyester. According to some embodiments, aliphatic-aromatic polyesters may have an aromatic part including polyfunctional aromatic acids, and an aliphatic part including aliphatic diacids, aliphatic diols, and mixtures thereof. Aliphatic-aromatic polyesters according to some embodiments may have an aromatic acid of about 30% to about 70% in moles, e.g., from about 40% to about 60% in moles. In some embodiments, the polymer used in foams of the present disclosure includes one or more aliphatic-aromatic polyesters selected from the group consisting of: poly(1,4-butylene adipate-co-1,4-butylene terephthalate), poly(1,4-butylene sebacate-co-1,4-butylene terephthalate), poly(1,4-butylene azelate-co-1,4-butylene terephthalate), poly(1,4-butylene brassylate-co-1,4-butylene terephthalate), poly(1,4-butylene succinate-co-1,4-butylene terephthalate), poly(1,4-butylene adipate-co-1,4-butylene sebacate-co-1,4-butylene terephthalate), poly(1,4-butylene azelate-co-1,4-butylene sebacate-co-1,4-butylene terephthalate), poly(1,4-butylene adipate-co-1,4-butylene azelate-co-1,4-butylene terephthalate), poly(1,4-butylene succinate-co-1,4-butylene sebacate-co-1,4-butylene terephthalate), poly(1,4-butylene adipate-co-1,4-butylene succinate-co-1,4-butylene terephthalate), poly(1,4-butylene azelate-co-1,4-butylene succinate-co-1,4-butylene terephthalate), poly(1,4-butylene azelate-co-1,4-butylene succinate-co-1,4-butylene adipate-co-1,4-butylene terephthalate), poly(1,4-butylene azelate-co-1,4-butylene succinate-co-1,4-butylene sebacate-co-1,4-butylene terephthalate), poly(1,4-butylene azelate-co-1,4-butylene succinate-co-1,4-butylene brassylate-co-1,4-butylene terephthalate), poly(1,4-butylene azelate-co-1,4-butylene succinate-co-1,4-butylene adipate-co-1,4-butylene sebacate-co-1,4-butylene terephthalate), poly(1,4-butylene azelate-co-1,4-butylene succinate-co-1,4-butylene adipate-co-1,4-butylene brassylate-co-1,4-butylene terephthalate), poly(1,4-butylene azelate-co-1,4-butylene succinate-co-1,4-butylene brassylate-co-1,4-butylene sebacate-co-1,4-butylene terephthalate), poly(1,4-butylene azelate-co-1,4-butylene succinate-co-1,4-butylene adipate-co-1,4-butylene sebacate-co-1,4-butylene brassylate-co-1,4-butylene terephthalate). In certain preferred embodiments, the aliphatic-aromatic polyester is poly(1,4-butylene adipate-co-1,4-butylene terephthalate) or poly(1,4-butylene adipate-co-1,4-butylene azelate-co-1,4-butylene terephthalate). In some embodiments, the polymer used in foams of the present disclosure may include mixtures of two or more different polyesters described herein.

In some embodiments, recycled feedstocks are employed to produce the suitable recyclable polymer or polymer blends of the present disclosure. It is an object of certain embodiments to use recycled polymer feedstocks whenever possible. An example of using recycled feedstocks, according to some embodiments, is to use post-industrial polyamide carpet fiber, collected ocean plastic fishing nets, or other plastic waste materials that are collected, sorted, melted down, and reprocessed. In some such examples, the collected waste materials can be reprocessed into virgin-quality polyamide precursors (e.g., caprolactam). An exemplary caprolactam derived from post-industrial carpet fiber and used fishing nets is Econyl manufactured by the Aquafil USA Inc., Cartersville, Georgia. The aforementioned thermoplastic polymer resin has shown advantageous technical properties in forming the optimal microcellular flexible foam structure according to embodiments of the present disclosure. Some of these technical properties include exceptional aging properties, excellent elongation, tensile strength, and compression set, among other benefits.

Still further, in some embodiments, a bio-derived polymer is used to produce the flexible foams of the present disclosure. In some embodiments, the terms "bio-derived" or "bio-polymer" or "bioplastic" may be used interchangeably herein to refer to polymers that are derived from current, preferably renewable, biological sources (e.g., as opposed to petroleum-based or other fossil fuel-based sources) or are made from precursor materials (e.g., reactants, monomers, etc.) that are derived from such current biological sources. In some such embodiments, the biological source may be a renewable botanical (plant) source. For example, the bio-derived polymer or its precursor materials may be derived from plant cellulose, plant oils, and/or other plant materials. In some embodiments, the bio-derived polymer is or includes one or more of the polyesters described above, for example, one or more aliphatic-aromatic polyesters. In some embodiments, the bio-derived polymer includes one or more branched polyesters. One non-limiting example of a suitable bio-polymer for use in the present disclosure is a bio-derived PBAT. In some embodiments, the bio-derived PBAT is both biodegradable and industrially compostable. In some embodiments, a bio-derived PBAT may be formed from precursors including azelaic acid and bio-derived biobutane-diol (bio-BDO). The one or more bio-polymers used in the manufacture of the foams (e.g., bio-derived PBAT, bio-derived branched polyester, or other bio-derived aliphatic-aromatic polyesters) demonstrate overall advantageous technical properties in forming the optimal microcellular flexible foam structure according to embodiments of the present disclosure. Some of these technical properties include exceptional aging properties, excellent elongation, tensile strength, and compression set, among other benefits. In addition to plants, in some embodiments the biological source of the "bio-derived" or "bio-polymer" or "bioplastic" material(s) includes, for example, microorganisms (e.g., bacteria), algae, fungi, animals (e.g., animal fats/lipids), and/or insects.

In some embodiments, blends of two or more thermoplastic polymers can be utilized. In some embodiments, the blends of two or more thermoplastic polymers can provide a combination of properties not found in a single polymer. There are a number of ways to blend polymers together successfully. One such method is to use a twin-screw extruder to melt two or more polymer resins together and to then extrude the molten polymer resin blend into a strand that is cooled and fed into a pelletizer for producing an array of pelletized pieces called a masterbatch. Another method of polymer blending is to use compatibilizing agents to join unlike polymers together in a polymer blend. This method may also use twin-screw extrusion or the like to melt the compatibilizing agent and two or more polymers together to form the blend.

Additives

In certain embodiments, depending on the application, one or more additives may be optionally added to the polymer formulations. The one or more additives can include, for example, one or more fillers, nucleating agents, and/or colorants. In some embodiments, the one or more additives may be included to adjust the physical and/or chemical properties of the resulting foams. Preferably, in some embodiments, the one or more additives includes or consists of recyclable and/or compostable materials. In some embodiments, one or more biodegradable and/or recyclable binding agents (binders) are optionally included to assist with fusing the puffed pellets together. In some embodiments, the one or more additives may be added to the polymer prior to extrusion (e.g., mixed with the master-batch). In some embodiments, the one or more additives may additionally or alternatively be added into the extruder and mixed with the polymer in the extruder (e.g., via side in-feeding into the extruder).

In some embodiments, one or more fillers may optionally be added to the polymer to reduce part cost. For example, in some embodiments, the one or more fillers may have lower cost per weight than the polymer material and be used to add physical bulk to the product and/or improved specific properties. In some non-limiting examples, the one or more fillers, when included, may be added in a range of 1% to 30% in load weight ratio. The one or more fillers may include, for example, precipitated calcium carbonate, oolitic aragonite, starches, biomass, or the like. In some embodiments, the materials for the one or more filler are selected such that the flexible foams and/or end products remain recyclable and/or compostable.

Nucleating agents, for example, micro-lamellar talc or high aspect ratio oolitic aragonite, may be included in some embodiments. Nucleating agents, in certain embodiments, can greatly improve key properties of the resulting flexible foam by preventing cellular coalescence (e.g., the merging of gas bubbles), lowering bulk density, and improving rebound resilience, among other beneficially enhanced attributes. In some such embodiments, the nucleating agent improves foaming by increasing the amount of individual gas bubbles in the foam material. Several non-limiting examples of nucleating agents for use in producing flexible foams include micro-lamellar talc marketed as Mistrocell® by Imerys Talc America Inc., Houston, Texas and high aspect ratio oolitic aragonite marketed as OceanCal® by Calcean Minerals & Materials LLC, Gadsden, Alabama. In some non-limiting examples, the one or more nucleating agents, when included, may be added in a range of 0.1% to 10% in load weight ratio.

In further embodiments, one or more additives may be included that are configured accelerate and/or improve the biodegradation of the finished foam product. In one example, oligomeric poly(aspartic acid-co-lactide) (PAL) may be optionally compounded into the masterbatch for accelerating biodegradation as appropriate in certain instances and for specific end-market uses.

In some embodiments, one or more colorants may optionally be included in order to change the color of the resulting flexible foam. For instance, various colorants such as dyes or pigments may optionally be included in the polymer formulations of the present invention. Several non-limiting examples are pigments that have been tailor-made for specific types of thermoplastic polymer use, for example, pigments offered by Treffert GmBH & Co. KG, Bingen am Rhein, Germany or those offered by Holland Colours Americas Inc., Richmond, Indiana. In some non-limiting examples, the one or more colorants, when included, may be added in a range of 0.1% to 5% in load weight ratio.

Foaming and Blowing Agents

In order to produce a foam according to certain processes of the present disclosure, the polymer formulations are mixed with a foaming agent. A widely known foaming agent used in conventional manufacturing processes is azodicar-bonamide (ADA). ADA is often used as a chemical blowing agent and is typically pre-impregnated into conventional thermoplastic masterbatch resins for use in conventional injection molding foam processes. However, ADA is not considered environmentally friendly, and is a suspected carcinogen to human health. Moreover, conventional foaming processes using ADA typically produce foams which are cross-linked during the manufacturing process and therefore are not recyclable or compostable. Therefore, in preferred embodiments, processes of the present disclosure do not use ADA. No cross-linking agents are incorporated into foams of certain embodiments of the present disclosure.

Processes according to embodiments of the present disclosure may utilize one or more inert physical blowing agents instead of chemical blowing agents. In some embodiments, an inert gas is used as a foaming agent for foaming processes of the present disclosure. In some embodiments, the foaming agent used in embodiments of the present disclosure is either nitrogen gas ($N_2$) or carbon dioxide ($CO_2$). In some embodiments, the foaming agent is introduced as a supercritical fluid (SCF) into the polymer material. For example, the SCF may include or consist of supercritical $N_2$ or supercritical $CO_2$. In some embodiments, the SCF and polymer material forms a single-phase solution. In some embodiments, the foaming processes of the present disclosure includes passing a single-phase solution of polymer and supercritical fluid (SCF) through the extruder die to form an extrudate in a continuous form. In some embodiments, the extrudate has an annular shape. In some embodiments, the extrudate is formed into flat sheets. Other shapes are also possible according to other embodiments. In some embodiments, homogeneous cell nucleation occurs when a single-phase solution of polymer and supercritical fluid (SCF) passes through the extruder die. In some embodiments, as the solution exits the extruder die, the pressure drops, which in turn causes the SCF to come out of solution creating, cell nuclei (e.g., gas bubbles). The cells then grow until the material expands, and the expansion capabilities of the SCF are expended, thereby stabilizing the resulting foam. As will be described further herein, processes according to some embodiments may be run on extrusion machines that have been modified to allow the metering, delivery, and mixing of the inert SCF into the polymer to create the single-phase solution.

Differences in the effectiveness of nitrogen and carbon dioxide as foaming agents stem from their behavior in the polymer melt. Carbon dioxide, which becomes an SCF fluid at temperatures and pressures higher than its critical point (about 31° C. and about 73 bar), is 4 to 5 times more soluble in polymers than nitrogen, which becomes a supercritical fluid at about −147° C. and about 34 bar. For example, the saturation point in an unfilled polymer is about 1.5 to 2 percent by weight of nitrogen, depending on temperature and pressure conditions, while the saturation level of carbon dioxide is closer to 8 percent by weight. Carbon dioxide also exhibits a greater mobility in the polymer, allowing it to migrate further into existing bubbles than nitrogen. From the perspective of cell nucleation, greater solubility and mobility means fewer cells will be nucleated, and those that do nucleate will tend to be larger.

Solubility, however, becomes an advantage according to certain embodiments when the goal is viscosity reduction. In some embodiments, lower viscosity may be beneficial for lower part weights. In some embodiments, an SCF dissolved in a polymer acts as a plasticizing agent, reducing the viscosity of the polymer. Because viscosity reduction is partly a function of the amount of SCF added to the polymer, and because carbon dioxide has a higher solubility limit than nitrogen, the ability to reduce viscosity with carbon dioxide is greater.

Carbon dioxide is also preferred as the foaming agent, in some embodiments, when the amount of nitrogen needed to produce a part is so low that it is not possible to consistently process parts. In some embodiments, given that carbon dioxide has a higher solubility in the polymer than nitrogen, there are times where it is easier to run low levels of carbon dioxide, 0.15 or 0.2 percent, as compared to very low levels of nitrogen, less than 0.05 percent. This occurs primarily with soft materials and parts with thick cross sections.

In some alternative embodiments, one or more blowing agents are used for pre-expanding pre-foamed pellets of the polymer materials. In some embodiments, the blowing agent is an inert gas. In some such embodiments, the blowing agent may be either nitrogen or carbon dioxide. In some embodiments, the pre-expansion infuses a gas (e.g., nitrogen or carbon dioxide) into the polymer pellets, thereby forcing their individual expansion to form a pre-foamed puffed pellet. In some embodiments, these pre-foamed pellets are then extruded into continuous sheets in varying thicknesses and lengths to meet a given need. The finished fused sheets of pellets are the result of the fusion of each individual pre-foamed pellet into a plurality of foamed and fused pellets. The finished homogeneous sheet is then ready for die cutting or molding by conventional means such as those known in the art.

In further embodiments, the SCF may be mixed into the polymer material in an autoclave configured to operate at predetermined pressures and temperatures. The autoclave, for example, may include a chamber that is pressurized by the SCF for a sufficient time to allow the SCF to mix with the polymer material. As will be described in further detail below, subsequent depressurization of the chamber will cause the SCF to form cell nuclei (e.g., gas bubbles) in the polymer material which expand to form a foam. In some embodiments, the polymer material is introduced into the autoclave as an un-foamed solid block or sheet (e.g., an extruded block or sheet). In other embodiments, the polymer material may be dissolved in a solvent and introduced into the autoclave in a solution. The autoclave may be maintained at a pressure and temperature for a sufficient hold time in order to saturate the polymer material followed by depressurization to cause the polymer material to foam.

Extrusion System

According to some aspects, the present disclosure provides a system for producing a recyclable, biodegradable, and/or industrially compostable flexible foam. In various embodiments, the system may include one or more of the following components: at least one extruder configured for melting and conveying the polymer material, a hopper configured to introduce the polymer material (e.g., in the form of pellets) into the extruder, and a die for shaping the material extruded by the extruder. In some embodiments, the aforementioned components may be combined in a single apparatus. In some embodiments, a system according to the present disclosure further includes a gas source configured to supply a foaming agent or blowing agent (e.g., nitrogen or carbon dioxide) to be mixed with the polymer material. In some embodiments, the system further includes a control system configured to control various process parameters of the extrusion system, for example, but not limited to, one or more of temperature, pressure, polymer feeding rate, gas dosing, or extrusion speed.

In some embodiments, the at least one extruder may be a screw extruder. In some such embodiments, the screw extruder includes a barrel and at least one screw disposed within the barrel and configured to rotate therein. In some embodiments, the at least one screw is configured to compress, melt, and convey the polymer material introduced into the extruder. In some embodiments, a hopper may be included for feeding the polymer masterbatch (e.g., pelletized polymer material) into the barrel of the extruder. In some embodiments, the polymer masterbatch may be gravity-fed from the hopper through a throat of the hopper into the barrel and screw assembly of the extruder.

In some embodiments, the at least one screw may be driven by one or more motors. In some embodiments, the screw extruder is a multiple-screw extruder having more than one rotating screw. In some such embodiments, the screw extruder may be a twin-screw extruder having a pair of parallel screws that are intermeshed. In further embodiments, the screw may be a reciprocating screw. The reciprocating screw may include three zones: the feeding zone, the compressing (or transition) zone, and the metering zone. In some embodiments, a system includes at least two extruders. In some embodiments, a system includes a first, melt extruder that feeds material into a second, cooling extruder.

In some embodiments, a nozzle may be present, where the nozzle connects the barrel of an extruder to a die and forms a seal between the barrel and the die. In some embodiments, the temperature of the nozzle may be set to the polymer material's melt temperature or just below it. In some embodiments, the die includes a sprue bushing and the nozzle connects to the sprue bushing. In some embodiments, a delivery system may also be included. The delivery system, in some embodiments, provides a passage for the molten polymer from the nozzle to the die and may generally include a sprue, cold slug wells, a main runner, branch runners, gates, and the like. In some embodiments, when the barrel is in its full forward processing position, the radius of the nozzle may nest and seal in the concave radius of the sprue bushing with a locating ring. During purging (cleaning) of the barrel, the barrel may back-out from the sprue, so the purging compound can free fall from the nozzle.

In a further aspect, the system may additionally include a supercritical fluid (SCF) dosing system configured for receiving a gas (e.g., nitrogen or carbon dioxide) and introducing the received gas into the barrel of the extruder under conditions so as to produce a supercritical fluid upon said introduction. In some embodiments, the supercritical fluid dosing system may be configured to alter the pressure and/or temperature of the received gas to be beyond the gas' critical point. In some embodiments, for example, the SCF dosing system may include a supply of gas (e.g., nitrogen or carbon dioxide), an air compressor, an SCF metering and control device, SCF injector, and front and back non-return valves. In some embodiments, the supercritical fluid mixes with the thermoplastic polymer within the barrel of the extruder. In some embodiments, the supercritical fluid and the thermoplastic polymer form a single-phase solution within the barrel of the extruder. In some embodiments, the creation of the single-phase solution, in which the SCF is fully dissolved and uniformly dispersed in the molten polymer, takes place inside the extruder barrel under carefully controlled process conditions. In some embodiments, the SCF should be accurately mass flow metered into the polymer for a fixed amount of time, and during that dosing period, specific conditions of temperature, pressure and shear must be established within the barrel. In some embodiments, back-pressure, screw-speed and barrel-temperature control, as well as the SCF dosing system all play a role in establishing the process conditions that create the single-phase solution.

In some embodiments, process set-up procedures revolve around establishing a controlled SCF dosing into the extrusion barrel under screw speed, temperature, and pressure conditions that result in a single-phase solution. In some embodiments, one or more of the following system parameters may adjusted to ensure that basic conditions of SCF dosing are met:

1) SCF Saturation Pressure: In some embodiments, the effects of the inert gas saturation pressure and saturation temperature play a major role in the expansion ratio of the foam. In some non-limiting examples, saturation pressures can range from 75 bar to 200 bar, and preferably 90 bar to 150 bar. Inert gas saturation temperatures can range, for example, from 90° C. to 200° C., depending on the specific biodegradable, industrially compostable, and/or recycled and/or recyclable polymers drop point and melt temperatures. Furthermore, the mean pore size and cell density of the foam is controllable to a certain degree with the adjustment of the saturation pressure (the pressure of the inert gas saturation into the chosen polymer). A high inert gas saturation pressure is preferable in some embodiments for obtaining small mean pore size and high cell density. The effects of the inert gas saturation pressure and saturation temperature play a major role in the expansion ratio of the foam.

2) SCF Injector Open Position: this setpoint sets the screw position at which the SCF dosing starts. The position should be set so that the pressure in the barrel during screw recovery has become stable prior to the start of dosing. As a non-limiting example, the open position could be in the range of 0.3 and 0.4 inches.

3) SCF Percent: this controls the actual mass of SCF dosed. A non-limiting example of the SCF percent could be in the range of 0.45% and 0.75%, and more preferably 0.5%.

4) Dosing Optimization: This is accomplished by maximizing the dosing time and minimizing the flow rate (pressure difference between the pre-metering pressure and the delivery pressure). A non-limiting example of the dosing time is between 1-2 seconds, and more preferably 1.7 seconds. In some embodiments, the single polymer melt is nucleated within the die and is released at the outlet of the die as a single polymer melt stream whereby the release time is preferably a fraction of a fraction of a second.

In some embodiments, once the single-phase solution has been created, the extruder maintains the solution in a pressurized state until the start of extrusion. In some embodiments, extruder does so through the combined efforts of a pressure regulator valve and melt pump control. In some embodiments, the pressure regulator valve prevents depressurization and premature foaming into the die element. In further embodiments, either active or passive screw position control may be utilized to prevent depressurization through the backward movement of the screw. According to some such embodiments, during active screw position control, the position of the screw is continuously monitored, and the pressure applied to the back of the screw is adjusted to maintain a position setpoint or a constant pressure is held on the back of the screw. In passive position control, an oil may be used to regulate back pressure and is prevented from draining to its tank at the end of screw recovery. This residual oil keeps the screw from moving backward due to the pressure of the single-phase solution.

In some embodiments, a system of the present disclosure may further include one or more temperature sensors configured for monitoring and/or controlling the temperature within the barrel or other components of the system. In some embodiments, the system may include one or more pressure sensors configured for monitoring and/or controlling the pressure within the barrel or other components of the system. Additionally, a control unit having one or more microprocessors may be included, the control unit being configured for controlling one or more of the extruder and the supercritical gas dosing system, in accordance with one or more system parameters. In some embodiments, a control system may be configured to provide consistency and repeatability in the extruder operation. In some embodiments, the control system monitors and controls the processing parameters, including the temperature, pressure, SCF dosing, injection speed, screw speed and position, and hydraulic position. The control system can range from a simple relay on/off control to an extremely sophisticated microprocessor-based, closed-loop control.

In some embodiments, the system and/or any sub-systems thereof may include one or more sensors, for example, temperature sensor, pressure sensor, accelerometer, gyroscope, and an orientation sensor. In some embodiments, the one or more sensors are configured to be positioned in communication with one or more of the other components of the extrusion system, such as within the extruder, die, etc. In various embodiments, the one or more sensors may be smart sensors and include a communications module configured to connect to a network. In some embodiments, the communications module may be further configured to perform wireless communications. In some embodiments, the system, and/or any of its various parts may include a communications module that may be coupled to one or more of the control system, the SCF dosing system, and the gas counterpressure control unit, such as where the communications module is configured for performing one or more wireless communications protocols including WIFI, Bluetooth, Low Energy Blue Tooth, and 3G, 4G, and 5G cellular communications.

Figure 2:
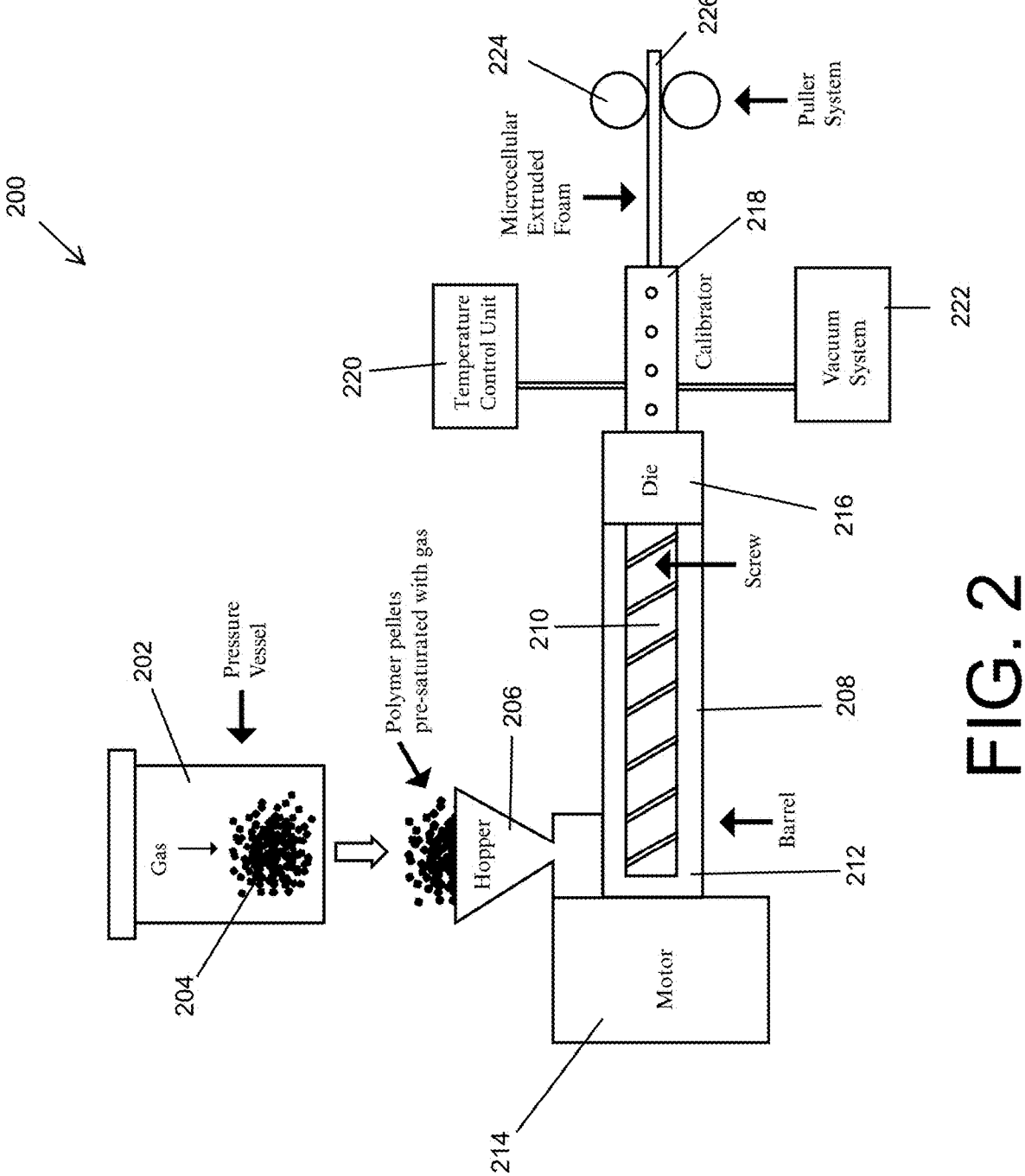
FIG. 2 is a diagram illustrating a system for forming extruded flexible foams according to some embodiments of the present disclosure.

FIG. 2 illustrates a system 200 for producing a flexible foam according to one non-limiting example. In some embodiments, in a first stage, system 200 includes a pressure vessel 202 configured for containing pellets of a masterbatch 204. The pellets may be composed of any one or more of the non-limiting examples of thermoplastic polymer materials described above. For example, the pellets may consist entirely of one or more recyclable thermoplastic polymers, or may consist entirely of one or more biodegradable thermoplastic polymers (e.g., one or more bio-polymers). In some embodiments, for example, the pellets of masterbatch 204 include or consist of PBAT (e.g., a bio-derived PBAT). In some embodiments, the pellets include or consist of a biodegradable branched polyester or other aliphatic-aromatic polyester as described above. In some embodiments, the pellets of masterbatch 204 may be infused or saturated with an inert gas (e.g., carbon dioxide or nitrogen) within pressure vessel 202.

In some embodiments, the effects of the inert gas saturation pressure and saturation temperature (e.g., within pressure vessel 202) play a major role in the expansion ratio of the foam. In some embodiments, saturation pressures can range from 75 bar to 200 bar, and preferably 90 bar to 150 bar. Inert gas saturation temperatures can range from 90° C. to 200° C., depending on the specific biodegradable, industrially compostable, and/or recycled and/or recyclable polymers drop point and melt temperatures. Furthermore, the mean pore size and cell density of the foam is controllable to a certain degree with the adjustment of the saturation pressure—the pressure of the inert gas saturation into the chosen polymer. A high inert gas saturation pressure is ideal for obtaining small mean pore size and high cell density.

In some embodiments, in a second stage following saturation with the inert gas, the pellets of masterbatch 204 are transferred to a hopper 206 that is configured to feed the pellets into an extruder 208. The pellets may be in an expanded state after saturation with the inert gas. In some embodiments, extruder 208 includes one or more extrusion screws 210 that are housed and configured to rotate within a barrel 212. The rotation of the one or more extrusion screws 210 may, for example, be driven by a motor 214. In some embodiments, the one or more extrusion screws 210 are configured to convey, compress, and fuse the saturated pellets of masterbatch 204 together as the pellets are extruded through extruder 208, forming a polymer melt. In some embodiments, one or more biodegradable and/or recyclable binding agents (binders) are optionally included to assist with fusing the pellets together.

In some embodiments, the polymer melt is extruded by extruder 208 through a die 216. The die 216, in some embodiments, may be positioned at an end of extruder 208 and is configured to shape the polymer melt as it passes through die 216. In some embodiments, the temperature of die 216 is set to the polymer material's melt temperature or just below it. In some embodiments, the polymer melt is extruded through die 216 and passes through a calibrator 218. In some embodiments, calibrator 218 is configured to cool the extrudate following extrusion through the die. In some embodiments, the calibrator 218 is connected to a temperature control unit 220 (e.g., Thermolator® brand temperature control unit). In some embodiments, the temperature control unit 220 is configured to control the temperature of calibrator 218. In some embodiments, the calibrator 218 and/or temperature control unit 220 is configured to sufficiently cool the extrudate as it passes through calibrator 218 in order to solidify the extrudate.

In further embodiments, calibrator 218 is connected to a vacuum system 222. In some embodiments, vacuum system 222 is configured to create a low-pressure zone. As the polymer melt exits die 216 and is exposed to the low-pressure zone, the gas that was incorporated into the polymer melt expands, forming the extruded foam 226. In further embodiments, a puller system 224 may be included to convey the extruded foam 226 away from die 216. Puller system 224 may include, for example, one or more rollers configured for receiving extruded foam 226. In some embodiments, the rollers of the puller system assist with shaping the extruded foam 226 (e.g., into a flat sheet).

Figure 3:
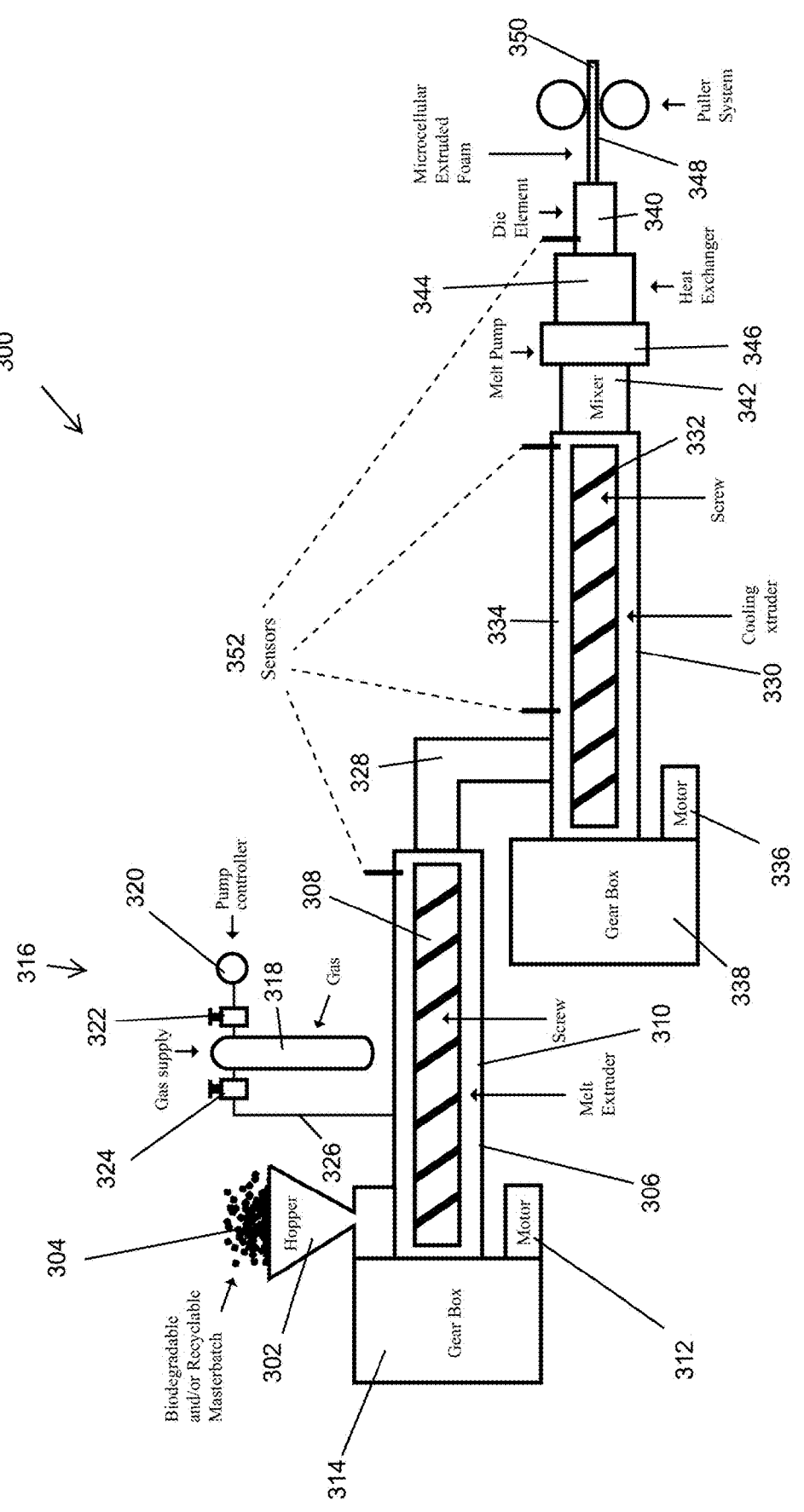
FIG. 3 is a diagram illustrating another system for forming extruded flexible foams according to some embodiments of the present disclosure.

FIG. 3 illustrates a system 300 for producing a flexible foam according to another non-limiting example. In some embodiments, system 300 includes a hopper 302 that is configured to feed the pellets of a masterbatch 304 into a first extruder 306. The pellets may be composed of any of the non-limiting thermoplastic polymer materials described above. In some embodiments, first extruder 306 is a melt extruder. In some embodiments, first extruder 306 includes one or more extrusion screws 308 that are housed and configured to rotate within a barrel 310. The rotation of the one or more extrusion screws 308 may, for example, be driven by a first motor 312 connected to extrusion screws 308 by a system of gears 314. In some embodiments, the one or more extrusion screws 308 are configured to convey, compress, and melt the pellets of masterbatch 304 as the pellets are extruded through first extruder 306, forming a polymer melt.

System 300, in some embodiments, includes a supercritical fluid (SCF) dosing system 316 configured to deliver an inert gas into first extruder 306 to be mixed with the polymer melt. In some such embodiments, SCF dosing system 316 includes, for example, one or more of a supply (e.g., tank) 318 of an inert gas (e.g., nitrogen or carbon dioxide), a pump controller 320, valves 322, 324 for controlling the flow of the inert gas, and an injection line 326 for injecting the inert gas into first extruder 306. In some embodiments, SCF dosing system 316 is configured to introduce the inert gas into first extruder 306 as a supercritical fluid. In some such embodiments, SCF dosing system 316 is configured to inject the inert gas into first extruder at a pressure and temperature that is above the gas' critical point. For example, in some embodiments, the SCF dosing system 316 is configured to introduce the supercritical fluid at a pressure ranging from about 150 bar to about 300 bar, and a temperature from about 150° C. to about 350° C. In some embodiments, the SCF dosing system 316 is configured to introduce the supercritical fluid at a pressure ranging from about 90 bar to about 150 bar, and a temperature from about 90° C. to about 200° C. In some embodiments, the pressure and temperature within first extruder 306 is sufficient to maintain the inert gas in its supercritical state.

In some embodiments, the supercritical fluid and polymer melt are mixed within first extruder 306 to form a single-phase solution. In some embodiments, the single-phase solution is extruded from first extruder 306 and into a second extruder 330 via a pipe 328. In some embodiments, second extruder 330 is a cooling extruder. In some embodiments, the use of second extruder 330 helps to avoid foam cell collapse and shrinkage. In further embodiments, the use of second extruder 330 aids in producing a smooth and homogenous foam structure. In some embodiments, second extruder 330 includes one or more extrusion screws 332 that are housed and configured to rotate within a second barrel 334. The rotation of the one or more extrusion screws 332 may, for example, be driven by a second motor 336 connected to extrusion screws 332 by a second system of gears 338. In some embodiments, the one or more extrusion screws 332 are internally cooled (e.g., via water, oil, or other coolant). In some such embodiments, cooling of the one or more extrusion screws 332 may prevent the polymer material being extruded through second extruder 330 from sticking to the one or more extrusion screws 332.

In some embodiments, second extruder 330 is configured to convey and extrude the polymer melt to through a die 340. Die 340, in some embodiments, is configured to shape the polymer melt as it passes through die 340. In some embodiments, system 300 includes a mixer 342 disposed between second extruder 330 and die 340. In further embodiments, system 300 includes a heat exchanger 344 disposed between second extruder 330 and die 340. In yet further embodiments, system 300 includes a melt pump 346 disposed between second extruder 330 and die 340. In some embodiments, melt pump 346 is configured to precisely control the output of die 340. In some such embodiments, melt pump 346 includes a suction side that receives the extruded material from second extruder 330 and a discharge side that outputs the extruded material to die 340. In some embodiments, the extruded material passes through mixer 342 from second extruder 330 to melt pump 346. In some embodiments, melt pump 346 is configured to output the extruded material to die 340 at a more consistent pressure and volume. In some embodiments, heat exchanger 344 is configured to help regulate the temperature of second extruder 330, melt pump 346, and/or die 340. In some embodiments, as the polymer melt exits die 340, the gas that was incorporated into the polymer melt expands, forming the extruded foam 350. In some embodiments, a puller system 348 may be included to convey the extruded foam 350 away from die 340.

In some embodiments, system 300 may further include one or more sensors 352 coupled to various components of the system. The one or more sensors 352 may include, for example, pressure sensors, temperature sensors, or the like, that are configured to measure various operating parameters of the components. The one or more sensors 352 may be coupled, for example, to one or more of the first extruder 306, the second extruder 330, and the die 340. In some embodiments, the one or more sensors 352 may further be configured to communicate (e.g., wirelessly) to a control system (not shown) that is, in turn, configured to control the operation of components of system 300 in response to the parameters detected by the one or more sensors 352. For example, the control system in some embodiments may rely on feedback from the one or more sensors 352 in order to operate and/or maintain certain components of system 300 at predetermined ranges temperatures and/or pressures. Extruder speeds, temperature control systems, and/or other components may be adjusted by the control system.

Figure 4:
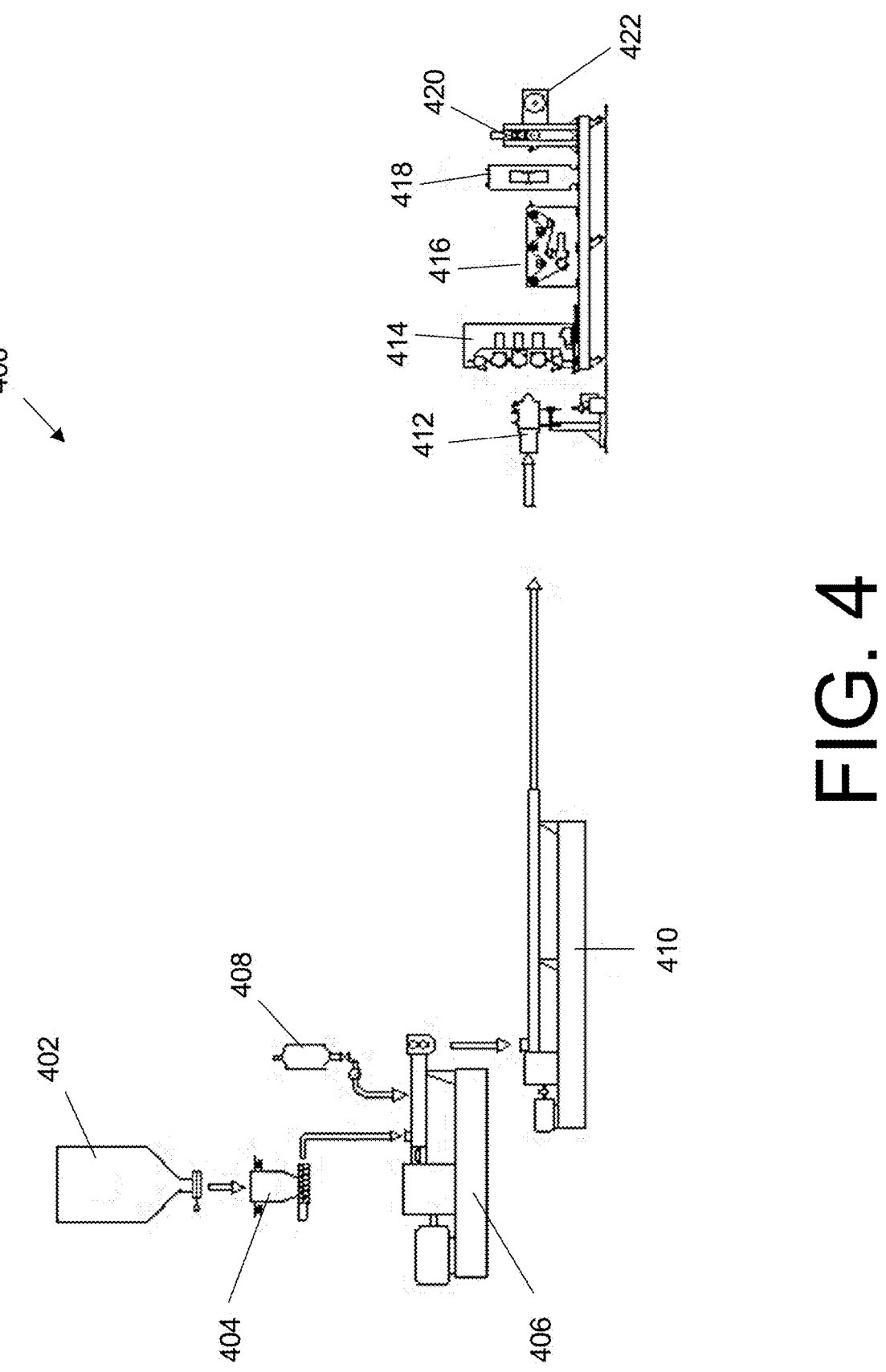
FIG. 4 is a diagram illustrating another system for forming extruded flexible foams according to some embodiments of the present disclosure.

FIG. 4 illustrates a system 400 for producing a flexible foam according to further non-limiting embodiments. In some embodiments, system 400 includes a hopper 402 that is configured to direct the pellets of a masterbatch into a feeder 404. In some embodiments, feeder 404 in turn is configured to feed the pellets into a mixer 406. Feeder 404 may be, in some embodiments, a loss-in-weight feeder. In some embodiments, feeder 404 is gravimetric feeder that measures the pellets' weight to achieve and maintain a predetermined feed rate of the pellets into mixer 406. Mixer 406, in some embodiments, may be configured as a first extruder similar to first extruder 306 described for system 300 above. In some embodiments, mixer 406 includes, for example, a barrel housing one or more rotating screws configured to convey, compress and/or melt the pellets received from feeder 404. The one or more screws may be driven by a motor. Mixer 406 may be a single-screw melt extruder, for example, or may be a twin-screw melt extruder in other embodiments.

As described in other embodiments above, the pellets of the masterbatch may be composed of any of the non-limiting thermoplastic polymer materials described above. For example, the pellets may include or consist of one or more bio-derived polymers (e.g., PBAT, biodegradable branched polyester, or other aliphatic-aromatic polyester). In other examples, the pellets may include or consist of one or more recyclable and/or recycled polymers (e.g., PEBA or other polyamide).

System 400, in some embodiments, includes a supercritical fluid (SCF) dosing system 408 configured to deliver an inert gas into mixer 406 to be mixed with the pellets. In some such embodiments, SCF dosing system 408 includes, for example, one or more supplies (e.g., one or more tanks) of an inert gas (e.g., nitrogen or carbon dioxide) and is configured to feed said inert gas into mixer 406. SCF dosing system 408 may further include additional components including, for example, a pump controller, valves for controlling the flow of the inert gas, and an injection line for injecting the inert gas into mixer 406. In some embodiments, SCF dosing system 408 is configured to introduce the inert gas into mixer 406 as a supercritical fluid. In some such embodiments, SCF dosing system 408 is configured to inject the inert gas into first extruder at a predetermined pressure and temperature that is above the gas' critical point. For example, in some embodiments, the SCF dosing system 408 is configured to introduce the supercritical fluid at a pressure ranging from about 150 bar to about 300 bar, and a temperature from about 150° C. to about 350° C. In some embodiments, the SCF dosing system 408 is configured to introduce the supercritical fluid at a pressure ranging from about 90 bar to about 150 bar, and a temperature from about 90° C. to about 200° C. In some embodiments, the pressure and temperature within mixer 406 is sufficient to maintain the inert gas in its supercritical state.

In some embodiments, the supercritical fluid and pellets are mixed within mixer 406. In some embodiments, the pellets are melted within mixer 406 and blended with the supercritical gas to form a single-phase solution. In some embodiments, the single-phase solution is fed from mixer 406 and into a extruder 410. Suitable piping (not shown) may be used to fluidically connect mixer 406 to extruder 410. In some embodiments, extruder 410 is a screw extruder including one or more extrusion screws that are housed and configured to rotate within a barrel. In some embodiments, extruder 410 may be configured similarly as extruder 330 described above in connection with system 300. In some embodiments, extruder 410 in some embodiments is a single screw extruder. In other embodiments, extruder 410 may be a twin-screw extruder.

In some embodiments, extruder 410 is configured to convey and extrude the single-phase solution comprising the polymer melt and supercritical fluid to through a die 412. Die 412, in some embodiments, is configured to shape the polymer melt as it passes through die 412. Die 412, in some embodiments, is a flat sheet die that is sized and configured to shape the polymer melt into a flat sheet. In some embodiments, as the polymer melt exits die 412, the gas that was incorporated into the polymer melt expands, forming an extruded foam sheet.

In some embodiments, system 400 optionally includes a roll calender 414 (e.g., a three-roll calender). Roll calender 414 may include a plurality of rollers wherein the extruded foam sheet is passed between pairs of the rollers. In some embodiments, the use of roll calender 414 may help smooth the surfaces of the extruded foam sheet as the sheet is passed between the rollers. In still further embodiments, system 400 may optionally include flattening machinery 416 configured to further flatten the extruded foam sheet. System 400 may also, in some embodiments, include thickness-measuring equipment 418 that is configured to gauge the thickness of the extruded foam sheet. For example, the thickness-measuring equipment 418 may be an automated tool that measures the thickness of the extruded foam sheet in order to determine if the extruded foam sheet is within or falls outside of a predetermined desired thickness range as part of a quality control process. The thickness-measurement equipment 418 may measure the thickness using, for example, visual analysis, mechanical gauges (e.g., calipers), optical/laser thickness gauges, ultrasonic thickness gauges, or other thickness gauges known in the art. System 400 may include other automated equipment useful for quality assurance, for example, tools for determining the weight and/or density of the foam sheet and/or tools for surface characterization of the foam sheet (e.g., to determine if the surface has the desired smoothness and/or to detect the presence of surface defects). In still further embodiments, system 400 may optionally include cutting equipment 420 for cutting the extruded foam sheet into the desired sizes and/or rolling equipment 422 configured to roll the extruded foam sheet into one or more rolls for later packaging or use.

Autoclave Process

Further embodiments of the present disclosure utilize an autoclave to produce a flexible foam from the biodegradable and/or recyclable polymer materials described herein. In some embodiments, the autoclave processes may generally include the steps of introducing a polymer material into an autoclave chamber, sealing the autoclave chamber, heating the autoclave chamber and pressurizing the autoclave chamber using an inert gas or supercritical fluid (e.g. $N_2$ or $CO_2$), maintaining the pressure and temperature within the autoclave chamber for sufficient time to impregnate the polymer material and/or dissolve the inert gas or fluid into the polymer material, and depressurizing the autoclave chamber by releasing the pressure to cause the inert gas or fluid to form expanding cell nuclei within the polymer material to foam the polymer material. The autoclave chamber may also be cooled during the depressurizing step. The foamed polymer material may then be removed from the autoclave chamber and, optionally, further shaped to the desired form (e.g., by cutting, compressing, etc.).

The polymer material may include or consist of any one or more of the biodegradable and/or recyclable materials described in the embodiments above. For example, in some embodiments, the polymer is a bio-derived polymer (e.g., PBAT, biodegradable branched polyester, or other aliphatic-aromatic polyester). In some embodiments, the polymer is a recyclable polymer (e.g., PEBA or other polyamide). In some embodiments, the polymer is a recyclable polymer that may be depolymerized into caprolactam monomers. As described previously, the selected biodegradable and/or recyclable materials may include or consist of one or more non-cross-linked polymers. In some embodiments, the polymer material may be introduced into the autoclave in a solid form, for example, an extruded sheet or block of polymer material. In other embodiments, the polymer material may be dissolved in a suitable liquid solvent and introduced into the autoclave chamber in a solution.

Figure 5:
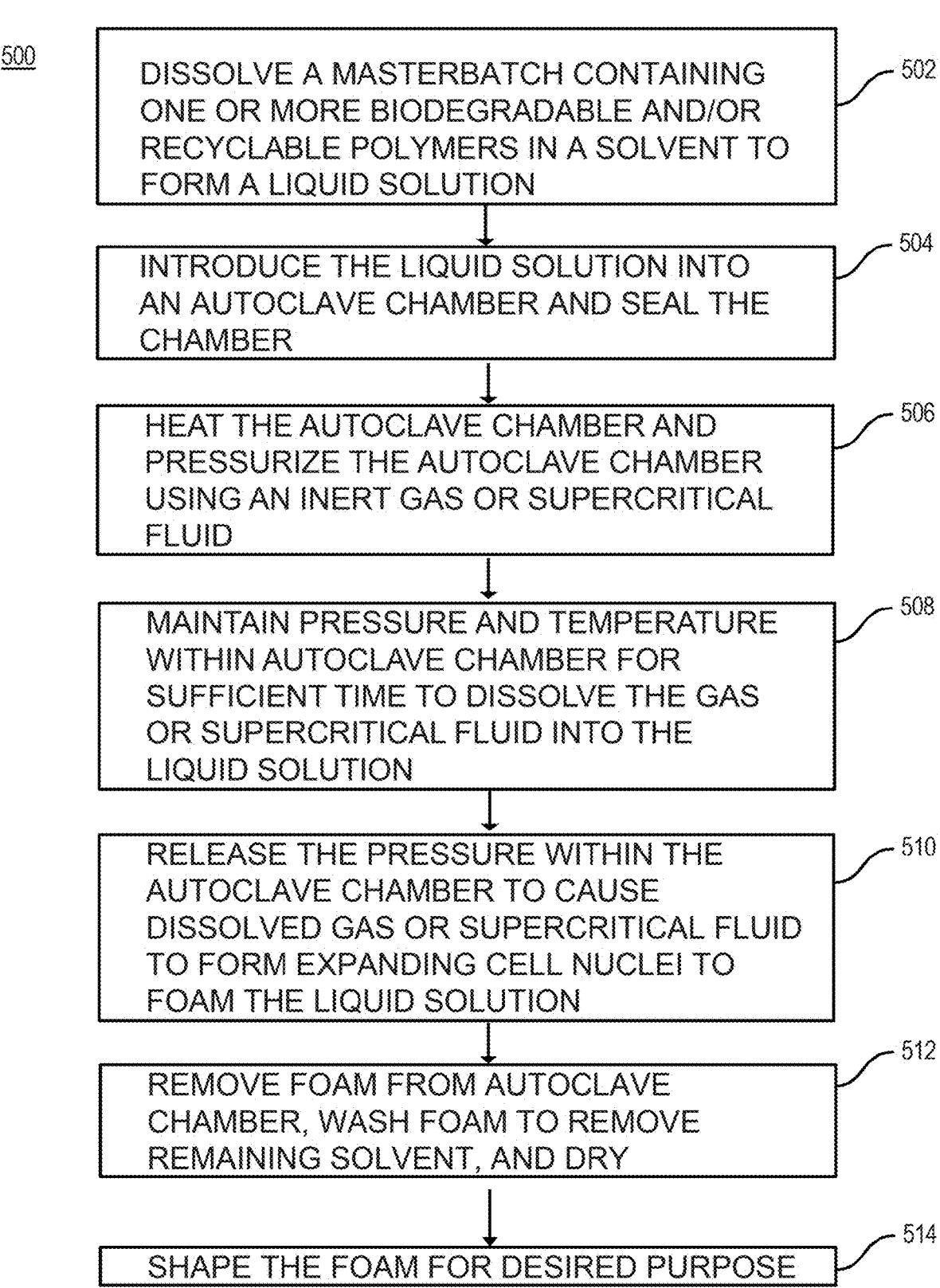
FIG. 5 is a flow chart of a process for forming flexible foams using an autoclave according to some embodiments of the present disclosure.

Some non-limiting example processes for forming a flexible foam with the use of an autoclave according to some embodiments are shown in the flowcharts of FIG. 5 and FIG. 6. More particularly, FIG. 5 outlines one or more steps that may be included in a process 500 for forming a flexible foam from biodegradable and/or recyclable polymers. According to some embodiments, process 500 includes a step 502 where a masterbatch including or consisting of one or more biodegradable and/or recyclable polymers is dissolved in a solvent to form a liquid solution containing the dissolved polymer(s). The polymer may be selected from any of the thermoplastic polymers already described herein (e.g. PEBA, polyamide, PBAT, biodegradable branched polyester, or other aliphatic-aromatic polyester), and the solvent may be a suitable organic solvent that is capable of dissolving said thermoplastic polymer(s). For example, the solvent may include methylene chloride or chloroform in some embodiments. Other solvents capable of dissolving thermoplastic polymers known in the art may also be utilized. The polymer(s) has been dissolved into the liquid solution, at step 504 the liquid solution may be introduced into the autoclave chamber, for example, in a suitable container that can withstand the pressure and temperatures of the autoclave and is of a material that will not react with the polymer or solvent (e.g., glass, stainless steel, etc.). The container may have a size and shape selected based on the desired size and shape of the foam. After positioning the liquid solution in the autoclave chamber, the autoclave chamber may be sealed.

At step 506, according to some embodiments, the autoclave chamber is heated and the internal pressure is increased. In some embodiments, the autoclave chamber is pressurized by an inert gas, for example, $N_2$ or $CO_2$, that is pumped into the autoclave chamber from a gas supply. In some embodiments, the inert gas includes or consists of $CO_2$. In some embodiments, the inert gas includes or consists of $N_2$. In some embodiments, the temperature and pressure within the autoclave chamber are raised above the critical temperature and pressure of the inert gas (e.g., about 31° C. and about 7.4 MPa for $CO_2$). In some embodiments, the inert gas includes or consists of both $N_2$ and $CO_2$. In some embodiments, the inert gas comprises a mix of 65%-85% $CO_2$ and 35%-15% $N_2$, by volume (e.g., 70% $CO_2$ and 30% $N_2$, or 80% $CO_2$ and 20% $N_2$). In some embodiments, the inert gas is converted to a supercritical fluid within the autoclave chamber. In some embodiments, the inert gas is introduced into the autoclave chamber already as a supercritical fluid (e.g., supercritical $N_2$ or supercritical $CO_2$). In some embodiments, the inert gas or supercritical fluid is the only added fluid used to pressurize the autoclave chamber. In other embodiments, the autoclave chamber may additionally be pressurized by air or a mix of air and the inert gas. No water steam is introduced into the autoclave chamber according to some embodiments.

At step 508, according to some embodiments, the pressure and temperature within the autoclave chamber is maintained in the elevated state for sufficient time ("hold time") such that the supercritical fluid in the autoclave chamber diffuses into and is dissolved into the liquid solution. In some embodiments, the pressure and temperature in the autoclave chamber are not necessarily held constant during this time but maintained within desired ranges. In some embodiments, the hold time is a predetermined amount of time. The hold time may range from less than one minute to greater than thirty minutes, for example. In some embodiments, the hold time may be selected depending on factors such as the amount of the liquid solution and the type of gas used. In some embodiments, the hold time may be greater than thirty minutes, greater than sixty minutes, at least 120 minutes, or at least 180 minutes, at least 240 minutes, at least 300 minutes, or at least 360 minutes depending on conditions. In other embodiments, the hold time may be less than 15 minutes, less than 10 minutes, or less than five minutes. In some embodiments, the hold time is between one minute and five minutes, between one minute and 10 minutes, between one minute and 15 minutes, between one minute and 30 minutes, or between one minute and 60 minutes. In some embodiments, the hold time is between 60 minutes to 120 minutes. In some embodiments, the hold time is between 120 minutes to 180 minutes. In some embodiments, the hold time is between 180 minutes to 240 minutes. In some embodiments, the hold time is between 240 minutes to 300 minutes. In some embodiments, the hold time is between 300 minutes to 360 minutes.

To maintain the pressure within the autoclave chamber, additional gas or supercritical fluid may be introduced into the autoclave chamber as needed. In some embodiments, the autoclave may include one or more pressure and temperature sensors/gauges configured to sense or measure the pressure and temperature within the autoclave chamber. Such sensors/gauges may provide pressure and temperature data to a controller (e.g., a computer controller) that is configured to automatically adjust the supply of inert gas/supercritical fluid to maintain the desired pressure within the autoclave chamber. In some embodiments, for example, the controller is configured to maintain the pressure and/or temperature in the autoclave chamber to be at least a predetermined target value during the hold time (e.g., at least 31° C. and at least 7.4 MPa when using $CO_2$). In some embodiments, for example, the controller is configured to maintain the pressure and/or temperature in the autoclave chamber during the hold time to be within plus or minus 10%, plus or minus 5%, or plus or minus 1% of a predetermined target value. In some embodiments, the controller may control an exhaust valve that is configured to vent gas from the autoclave chamber to reduce the pressure within the autoclave chamber as needed. In some embodiments, the controller may also control a gas supply valve to allow for additional gas or supercritical fluid to be introduced into the autoclave chamber to increase the pressure as needed. Moreover, in some embodiments, the controller may also be connected to a temperature control system that is configured to heat or cool the autoclave chamber in response to the sensed temperature to maintain the autoclave chamber at the desired temperature range. The temperature control system may include heating and/or cooling elements for adjusting the temperature within the autoclave chamber.

The supercritical fluid (e.g., supercritical $N_2$ or supercritical $CO_2$) acts as a blowing agent to foam the polymer(s), while the solvent in the solution is mostly vaporized and removed from the foam within the autoclave chamber according to some embodiments. In some embodiments, when the autoclave chamber is pressurized with the supercritical fluid, the supercritical fluid dissolves and carries the solvent away, resulting in a homogeneous mixture of the polymer(s) and the solvent/supercritical fluid mixture. As the solvent is removed from the solution, the polymer(s) can solidify to form the flexible foam according to some embodiments. When the pressure is released (step 510), the solvent/supercritical fluid mixture rapidly expands, foaming the polymer into a solid foam structure.

In some embodiments, pressure is released after the predetermined hold time has passed. In some embodiments, pressure may be released by venting the gas from the autoclave chamber. For example, the controller may be programmed to open an exhaust valve to allow gas to exit the autoclave chamber and cause a drop in pressure. In some embodiments, the pressure is decreased to about atmospheric pressure. The rate of the pressure drop may be controlled by the controller. In some embodiments, the pressure is dropped rapidly (e.g., in less than 30 seconds, less than 10 seconds, less than five seconds, or less than one second). In other embodiments, the pressure is released more slowly (e.g., over a minute or more). In some embodiments, the pressure is released near instantaneously. In other embodiments, the pressure may be released in a step-wise fashion or gradually.

In some embodiments, as the pressure is released, the supercritical fluid dissolved in the solution forms cell nuclei (e.g., bubbles) in the polymer material. In some embodiments, the drop in pressure causes the supercritical fluid to transition to a gaseous state causing the cell nuclei to expand in volume and foam the polymer(s). In some embodiments, the solvent used to dissolve the polymer(s) may be dissolved by the supercritical fluid and evaporated during the release of pressure. In some embodiments, the polymer(s) are able to form a solid foam structure with the removal of the solvent. In some embodiments, the container used to hold the liquid solution imparts a shape to the solid foam structure as the polymer(s) come out of solution and expands.

In some embodiments, a counterpressure gas may be injected into the autoclave chamber to control the expansion of the foam. The counterpressure gas may be injected in a sufficient amount to counteract, at least partially, the immediate expansion of the foam when the pressure in the autoclave chamber is released, according to some embodiments. The use of the counterpressure gas, in some embodiments, may help produce a smoother surface on the foam by preventing gas bubbles from breaking through a surface of the foam before the foam material solidifies, for example. In some embodiments, the counterpressure gas may include the same gas as the inert gas/supercritical fluid used to foam the polymer material. For example, in some embodiments, if supercritical $CO_2$ is used to foam the polymer material, $CO_2$ gas may be used as the counterpressure gas, or if supercritical $N_2$ is used to foam the polymer material, $N_2$ gas may be used as the counterpressure gas. In other embodiments, a gas different than the supercritical fluid is used as the counterpressure gas. For example, if supercritical $CO_2$ is used to foam the polymer material, $N_2$ gas or compressed air may be used as the counterpressure gas in certain embodiments. In some embodiments, the dosing amount and pressure of the counterpressure gas may be dynamically controlled based on the sensed pressure within the autoclave chamber (e.g., via one or more pressure sensors). For example, in some embodiments the controller used to maintain the desired pressure and/or temperature within the autoclave chamber may also be configured to control the amount of counterpressure gas that is introduced into the autoclave chamber to counteract the expansion of the foam. The controller may receive data from the one or more pressure sensors and determine the amount of counterpressure gas based on these data.

In some embodiments, under certain conditions such as a relatively higher temperature and lower pressures, the supercritical fluid can cause the polymer to expand and form open-cell foams, where the cells are interconnected and have an open structure. Open-cell foams, for example, have a high surface area and can be useful for applications where high permeability and breathability are required. Under other conditions, such as a relatively lower temperatures and higher pressures, the supercritical fluid can cause the polymer to expand and form closed-cell foams, where the cells are isolated and have a closed structure. Closed-cell foams have low permeability and can be useful, for example, for applications such as non-permeable shoe insoles and midsoles. Therefore, the choice of autoclaving conditions can be used to tailor the cell structure of the foam to the desired application.

After or during the release of pressure, the foamed polymer material may be allowed to cool (e.g., to room or ambient temperature) according to some embodiments. The cooling process may include passive heat dissipation from the autoclave chamber and/or active cooling by the temperature control system. In some embodiments, at step 512, the solidified foamed may be removed from the autoclave chamber, washed to remove any excess solvent remaining in the foam, and then dried. In some embodiments, the foamed sheet or block may have dimensions that are in the range of 2 to 3 times greater than the initial dimensions of the un-foamed polymer sheet or block (2x to 3x expansion ratio). Different polymers will have saturate with the inert supercritical fluid differently, and therefore, result in different resulting foam densities. In some embodiments, for example, the resulting foam densities are in the range of 0.1 $g/cm^3$ to 0.13 $g/cm^3$. In some embodiments, the foam densities can be tailored to be in the range of 0.1 $g/cm^3$ to 0.28 $g/cm^3$ depending on the intended end-use of the foam. In some embodiments, typical foam hardnesses can be in the range of 30 Asker C to 50 Asker C, for example, between 35 Asker C and 45 Asker C. In some embodiments, the foam, at step 514, may then be optionally shaped for a desired purpose (e.g., cut to desired size/shape, compressed, rolled, etc.). For example, in some embodiments, the foam may be shaped into shoe components (e.g., shoe insoles or midsoles). In other embodiments, the foam may be shaped into seat cushions or other foam products. Optionally, the foam may be subjected to a compression molding process. In some embodiments, for example, the autoclaved foam is placed into a heat compression mold in the temperature range of about 120° C. to about 200° C., e.g., between 140° C. and 160° C., for one to several minutes, before cooling to approximately room temperature. This process slightly reduces the surface area of the foamed part and increases the density of the foam. As a non-limiting example, the foamed part may have had an expansion ratio of 2x during the autoclave process, and the compression molding may reduce the expansion ratio to 1.5x. The density of the foam may be increased by the compression molding process, with a density of approximately 12.5% higher in some embodiments.

FIG. 6 outlines one or more steps that may be included in a further process 600 for forming a flexible foam from biodegradable and/or recyclable polymers according to some embodiments of the present disclosure. Process 600 may be similar in some aspects to process 500 except that the biodegradable and/or recyclable polymer(s) is introduced in a solid form into the autoclave chamber rather than dissolved in a solvent. For example, process 600 in some embodiments includes a step 602 of producing or providing a sheet or block of the one or more biodegradable and/or recyclable polymer. In some embodiments, the sheet or block may be an extruded sheet or extruded block of the polymer(s). In some such embodiments, the extruded polymer sheet or extruded polymer block can be formed by an extrusion process as already discussed above (e.g., process 100). In some embodiments, the extruded polymer sheet or extruded polymer block is not foamed prior to being introduced into the autoclave chamber.

In some embodiments, methods according to the present disclosure includes a first extrusion process by which a solid, unfoamed extruded polymer sheet or block is produced, followed by an autoclave foaming process by which the extruded polymer sheet or block is expanded into a foam. For example, in some embodiments, a system similar to system 200 (FIG. 2) may be used to first form the extruded polymer sheet or extruded polymer block except that pressure vessel 202 is not needed to form the unfoamed extruded polymer. In this process, for example, the pellets of masterbatch 204 are fed directly into hopper 206 without first being saturated with gas. The unsaturated pellets are fed by hopper 206 into extruder 208. In some embodiments, extruder 208 includes one or more extrusion screws 210 that are housed and configured to rotate within a barrel 212. The rotation of the one or more extrusion screws 210 may, for example, be driven by a motor 214. In some embodiments, the one or more extrusion screws 210 are configured to convey, compress, and fuse the saturated pellets of masterbatch 204 together as the pellets are extruded through extruder 208 to form a polymer melt. In some embodiments, the polymer melt is extruded by extruder 208 through a die 216. The die 216, in some embodiments, may be positioned at an end of extruder 208 and is configured to shape the polymer melt as it passes through die 216. In some embodiments, the temperature of die 216 is set to the polymer material's melt temperature or just below it. In some embodiments, the polymer melt is extruded through die 216 and passes through a calibrator 218. In some embodiments, calibrator 218 is configured to cool the extrudate following extrusion through the die 216, as described in certain embodiments above. In some embodiments, a puller system 224 may be included to convey the extruded polymer away from die 216. Since in this process the pellets were not pre-saturated with gas, the extruded polymer will not be foamed as it exits die 216. The extruded polymer may then be shaped as desired, for example, cut into blocks or rolled into sheets for later foaming/expansion in the autoclave process.

In some further embodiments, a system similar to system 300 (FIG. 3) may be used to first form the extruded polymer sheet or extruded polymer block, except that SCF dosing system 316 is not needed to form the unfoamed extruded polymer. In this process, for example, the pellets of the masterbatch may be feed into hopper 302 that is configured to feed the pellets of a masterbatch 304 into a first extruder 306. The pellets may be composed of any of the non-limiting thermoplastic polymer materials described above. In some embodiments, first extruder 306 is a melt extruder. In some embodiments, first extruder 306 includes one or more extrusion screws 308 that are housed and configured to rotate within a barrel 310. The rotation of the one or more extrusion screws 308 may, for example, be driven by a first motor 312 connected to extrusion screws 308 by a system of gears 314. In some embodiments, the one or more extrusion screws 308 are configured to convey, compress, and melt the pellets of masterbatch 304 as the pellets are extruded through first extruder 306, forming a polymer melt. The polymer melt may then be conveyed to second extruder 330 that is configured to convey and extrude the polymer melt to through a die 340. Die 340, in some embodiments, is configured to shape the polymer melt as it passes through die 340 to form the extruded polymer. Since in this process a gas or supercritical fluid is not mixed into the polymer, the extruded polymer will not be foamed as it exits die 340. The extruded polymer may then be cooled and shaped, for example, cut into blocks or rolled into sheets for later foaming/expansion in the autoclave process. In some examples, the extruded polymer blocks or sheets may have a density of about 1.0 g/cm$^3$ to about 1.4 g/cm$^3$, e.g., about 1.1 g/cm$^3$ to about 1.3 g/cm$^3$.

In still further embodiments, a system similar to system 400 may be used to first form the extruded polymer except that SCF dosing system 408 is not needed to form the unfoamed extruded polymer. In this process, according to some embodiments, the pellets contained in hopper 402 are directed to feeder 404 (e.g., a loss-in-weight feeder), which in turn feeds the pellets into mixer 406. As discussed above, mixer 406 may be a melt extruder and include, for example, a barrel housing one or more rotating screws configured to convey, compress and melt the pellets received from feeder 404 into a polymer melt. No SCF is blended with the pellets in mixer 406 according to these embodiments. The polymer melt may then be fed from mixer 406 and into further extruder 410. In some embodiments, extruder 410 is a screw extruder including one or more extrusion screws that are housed and configured to rotate within a barrel. In some embodiments, extruder 410 may be configured similarly as extruder 330 described above in connection with system 300. In some embodiments, extruder 410 in some embodiments is a single screw extruder. In other embodiments, extruder 410 may be a twin-screw extruder. In some embodiments, extruder 410 is configured to convey and extrude the polymer melt through a die 412. Die 412, in some embodiments, is configured to shape the polymer melt as it passes through die 412. Die 412, in some embodiments, is a flat sheet die that is sized and configured to shape the polymer melt into a flat extruded polymer sheet. Since the SCF dosing system 408 is omitted in these embodiments, the extruded polymer sheet is not foamed at this stage. In some examples, the extruded polymer sheet may have a density of about 1.0 g/cm$^3$ to about 1.4 g/cm$^3$, e.g., about 1.1 g/cm$^3$ to about 1.3 g/cm$^3$.

In some embodiments, the flat extruded polymer sheet may be fed into a roll calender 414 (e.g., a three-roll calender). Roll calender 414 may include a plurality of rollers wherein the extruded polymer sheet is passed between pairs of the rollers. In some embodiments, the use of roll calender 414 may help smooth the surfaces of the extruded polymer sheet as the sheet is passed between the rollers. In still further embodiments, flattening machinery 416 configured to further flatten the extruded polymer sheet. In some embodiments, thickness-measuring equipment 418 as previously described may be used to gauge the thickness of the extruded polymer sheet. In some embodiments, the extruded polymer sheet may then be cut to desired sized (e.g., using cutting equipment 420) for later foaming/expansion in the autoclave process.

In further embodiments, the polymer sheet or block may be formed by a process other than extrusion. In some embodiments, the polymer sheet or block may be formed by an injection molding process. In some embodiments, an injection molding process may be used to provide an unfoamed polymer block or sheet having a desired pre-formed shape (also referred to herein as a "pre-formed sheet" or "pre-formed block") prior to autoclaving. In some such embodiments, the injection molding process uses a mold to impart a pre-determined shape to the pre-formed sheet or pre-formed block. The pre-formed sheet or pre-formed block, for example, may have a shape that is similar to but smaller than the shape of the foamed product produced during the later autoclaving process. In some non-limiting embodiments, the pre-formed shape is not a rectangular prism and/or not a polyhedron. In some embodiments, the pre-formed shape may be, for example, the shape of a shoe component (e.g., a shoe insole or midsole). The pre-formed shape may be any other shape that can be achieved via injection molding processes.

In some embodiments, an injection molding process for forming the pre-formed sheet or pre-formed block includes melting polymer pellets of a masterbatch to form a molten polymer and injecting the molten polymer into a mold that defines the size and shape of the pre-formed sheet or pre-formed block. For example, in some embodiments the polymer pellets may be compressed and heated in a screw conveyor to form the molten polymer and then injected (e.g., under the screw pressure) into a mold having a predetermined shape and size to form the pre-formed sheet or pre-formed block. The pre-formed sheet or preformed block may then be cooled in the mold to solidify and then removed from the mold according to some embodiments. In some embodiments, no foaming of the polymer material occurs during the injection molding process. The density of the pre-formed sheet or pre-formed block may be substantially the same as the density of the original polymer pellets. In some embodiments, for example, the pre-formed sheet or pre-formed block may have a density of about 1.0 g/cm$^3$ to about 1.4 g/cm$^3$, e.g., about 1.1 g/cm$^3$ to about 1.3 g/cm$^3$.

As described in other embodiments above, the pellets of the masterbatch may be composed of any of the non-limiting thermoplastic polymer materials previously described above. For example, the pellets may include or consist of one or more bio-derived polymers (e.g., PBAT, biodegradable branched polyester, or other aliphatic-aromatic polyester). In other examples, the pellets may include or consist of one or more recyclable and/or recycled polymers (e.g., PEBA or other polyamide). The polymer pellets of the masterbatch, in some embodiments, do not include any cross-linked polymers. In some embodiments, one or more additives as described previously above may optionally be added to the polymer pellets and/or the molten polymer during the injection molding process. The one or more additives can include, for example, one or more fillers, nucleating agents, colorants, UV stabilizers, and/or hydrolysis mitigators.

In some embodiments, the design of the mold for forming the pre-formed sheet or pre-formed block should account for the expansion ratio of the final foamed product achieved during the later autoclave process. This involves predicting how the thermoplastic polymer will expand and ensuring that the final foam structure will have the desired density and mechanical properties. For example, the pre-formed sheet or pre-formed block may expand during autoclaving to dimensions that are about 2 to about 3 times the initial dimensions of the pre-formed sheet or pre-formed block (a 2× to 3× expansion ratio). Accordingly, in this example, the mold may be designed to have a pre-determined dimensions that are half to a third the dimensions of the finished foamed sheet or foamed block.

Figure 7:
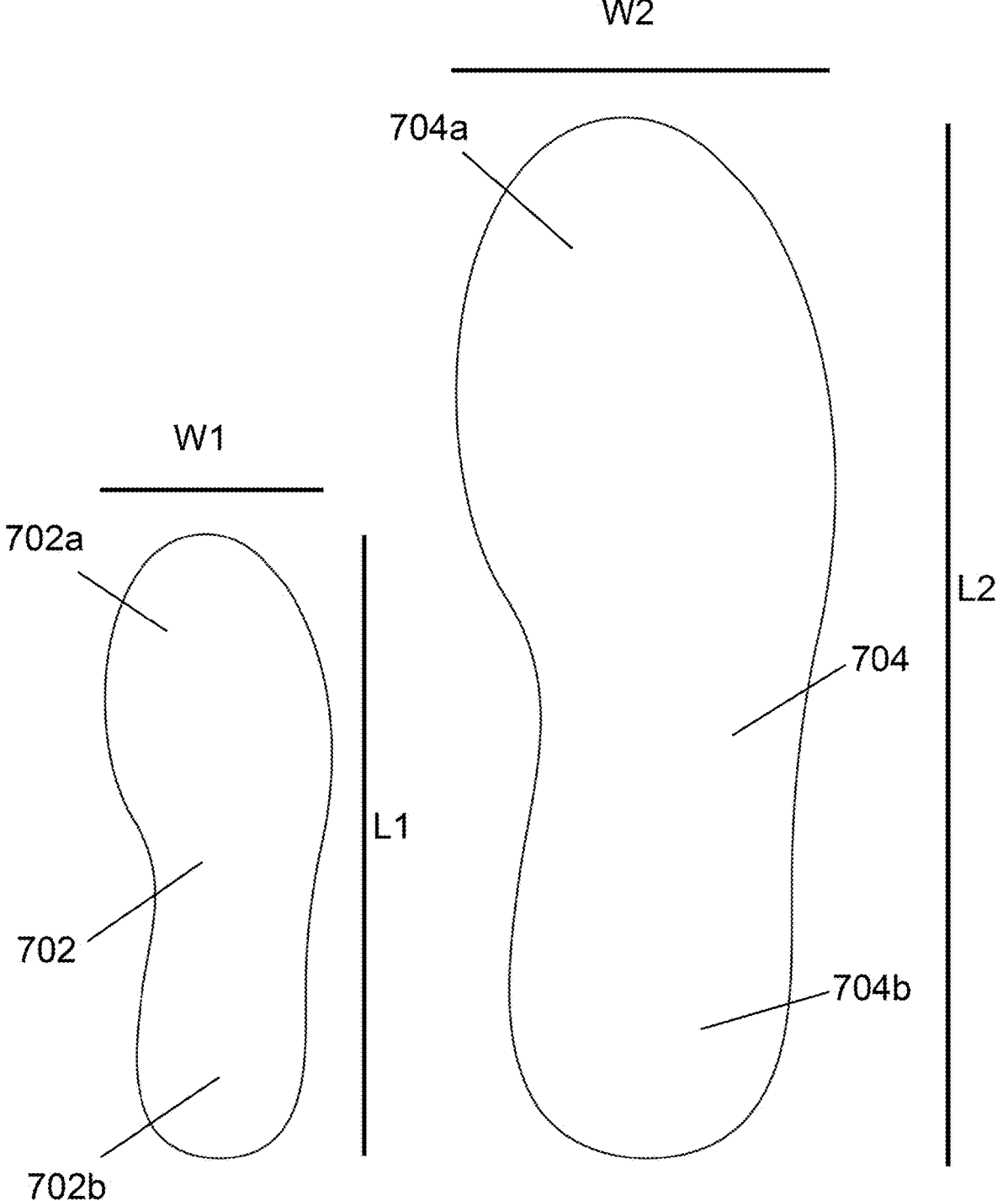
FIG. 7 is a diagram showing a comparison in relative size between a pre-formed polymer block in the shape of a shoe midsole prior to and after foaming according to an example embodiment.

Some embodiments for producing a shoe midsole, for example, would include determining the dimensions of the desired finished shoe midsole, and then designing the injection molding mold to have dimensions that are proportionally smaller to account for the later expansion. For example, the mold may be shaped like the finished midsole, but at half to a third of the dimensions of the desired finished midsole. For illustration, in one non-limiting example to produce a US size 9 men's shoe size with final outside dimensions of approximately 11 inch (279.4 mm) length×4 inch (101.6 mm) width×0.75 inch (19.05 mm) thickness, the injection molding process may be configured to produce a non-foamed pre-formed midsole shape with outside dimensions of approximately 5.5 inch (139.7 mm) length×2 inch (50.8 mm) width×0.375 inch (9.525 mm) thickness. This example accounts for a minimum of 2× expansion ratio from the pre-formed midsole shape to the final foamed midsole shape during the later autoclave process. In some embodiments, the pre-formed shoe midsole has a thinner forefoot area and a thicker heel area. For example, 15 mm in the forefoot and 20 mm in the heel portion. The pre-formed shoe midsole shape may be of any type of shoe shape and any type of shoe style. In several non-limiting examples, the pre-formed midsole shape may house recessed areas or cavities for later adding other types of shoe components into or onto. In some embodiments, stylized designs such as lines, shapes or patterns may optionally adorn the pre-formed midsole shape. Further still, a plurality of holes may be added into the pre-formed midsole shape for improved bonding strength to other shoe components in later stages of the shoe assembly. All of the aforementioned decorations to the pre-formed midsole may be applied to the pre-formed mold in the injection molding process. FIG. 7 shows a comparison of relative size between a non-foamed pre-formed block 702 in the shape of a shoe midsole prior to autoclaving and as foamed block 704 after autoclaving. The respective forefoot areas are shown as 702a and 704a and the respective heel areas are designated 702b and 704b. The pre-formed block 702 may have a width W1 and length L1. The foamed block 704 may have a width W2 that is greater than W1 and a length L2 that is greater than length L1. In some embodiments, W2 is 2 to 3 times the value of W1. In some embodiments, L2 is 2 to 3 times the value of L1.

Referring again to FIG. 6, at step 604 the polymer sheet or block, whether produced by one of the non-limiting processes described above or by some other method, is introduced into an autoclave chamber and the chamber is sealed. As discussed above, the polymer sheets or blocks may be formed by extrusion in some embodiments. In some embodiments, the polymer sheets or blocks may be injection molded. In some embodiments, the polymer sheets or blocks are pre-formed sheets or pre-formed blocks having a pre-formed shape as described above (e.g., the shape of a shoe component). In some embodiments, the polymer sheets or blocks may be arranged on racks or trays that are then introduced into the autoclave chamber. Such racks or trays may be movable on wheels, tracks, or rails for example to facilitate introduction into the autoclave chamber. In some embodiments, the polymer sheets or blocks are optionally suspended or hung within the autoclave chamber to maximize the exposed surface area of the polymer sheets or blocks which may, for example, facilitate saturation of the polymer sheets or blocks with the supercritical fluid during the autoclave process. The polymer sheets or blocks may be suspended from movable racks or trays in some embodiments.

At step 606, according to some embodiments, the autoclave chamber is heated and the internal pressure is increased. In some embodiments, the autoclave chamber is pressurized by an inert gas, for example, $N_2$, $CO_2$, or a mixture thereof, that is pumped into the autoclave chamber from a gas supply. In some embodiments, the inert gas includes or consists of $N_2$. In some embodiments, the inert gas includes or consists of $CO_2$. In some embodiments, the inert gas includes or consists of both $N_2$ and $CO_2$. In some embodiments, the inert gas comprises a mix of 65%-85% $CO_2$ and 35%-15% $N_2$, by volume (e.g., 70% $CO_2$ and 30% $N_2$, or 80% $CO_2$ and 20% $N_2$). In some embodiments, the temperature and pressure within the autoclave chamber are raised at least to or above the critical temperature and pressure of the inert gas (e.g., about 31° C. and 7.4 MPa for $CO_2$). Since the critical temperature and pressure of $CO_2$ is greater than those for $N_2$, where the inert gas is a mix of $N_2$ and $CO_2$, the temperature and pressure should be raised to at least or greater than the critical temperature and pressure of $CO_2$. In some embodiments, the pressure within the autoclave chamber is elevated to at least 100 bar (10 MPa), at least 125 bar (12.5 MPa), at least 150 bar (15 Mpa), at least 175 bar (17.5 MPa), or at least 200 bar (20 MPa). For example, the pressure within the autoclave chamber may be elevated to about 180 bar (18 MPa) to about 200 bar (20 MPa). In some embodiments, the temperature within the autoclave chamber is elevated to at least 75° C., at least 80° C., at least 85° C., at least 90° C., at least 95° C., at least 100° C., at least 105° C., at least 110° C., at least 115° C., at least 120° C., or at least 125° C. In some embodiments, for example, the temperature within the autoclave chamber is elevated to about 95° C. to about 115° C. In some embodiments, the inert gas is converted to a supercritical fluid within the autoclave chamber. In some embodiments, the inert gas is introduced into the autoclave chamber already as a supercritical fluid (e.g., supercritical $N_2$ or supercritical $CO_2$, or a mixture thereof). In some embodiments, the inert gas or supercritical fluid is the only added fluid used to pressurize the autoclave chamber. In other embodiments, the autoclave chamber may additionally be pressurized by air or a mix of air and the inert gas. No water steam is introduced into the autoclave chamber according to some embodiments.

At step 608, according to some embodiments, the pressure and temperature within the autoclave chamber is maintained in the elevated state for sufficient time ("hold time") such that the polymer sheet or block is saturated by the supercritical fluid in the autoclave chamber. In some embodiments, the pressure and temperature in the autoclave chamber are not necessarily held constant during this time but maintained within desired ranges. In some embodiments, the supercritical fluid infuses into the polymer sheet or block during this hold time. The hold time, according to some embodiments, may be selected to be sufficient for the diffusion of the supercritical gas into the solid polymer sheet or block to reach equilibrium. In some embodiments, the hold time is a predetermined amount of time. The hold time may range from less than one minute to greater than thirty minutes, for example, depending on factors such as the size of the polymer sheet or block and type of supercritical gas used. In some embodiments, the hold time may be greater than thirty minutes, greater than sixty minutes, at least 120 minutes, at least 180 minutes, at least 240 minutes, at least 300 minutes, or at least 360 minutes depending on conditions. In other embodiments, the hold time may be less than 15 minutes, less than 10 minutes, or less than five minutes. In some embodiments, the hold time is between one minute and five minutes, between one minute and 10 minutes, between one minute and 15 minutes, between one minute and 30 minutes, or between one minute and 60 minutes. In some embodiments, the hold time is between 60 minutes to 120 minutes. In some embodiments, the hold time is between 120 minutes to 180 minutes. In some embodiments, the hold time is between 180 minutes to 240 minutes. In some embodiments, the hold time is between 240 minutes to 300 minutes. In some embodiments, the hold time is between 300 minutes to 360 minutes.

Similar to embodiments of process 500 described previously, additional gas or supercritical fluid may be introduced into the autoclave chamber as needed to maintain the pressure within the autoclave chamber. In some embodiments, the autoclave may include one or more pressure and temperature sensors/gauges configured to sense or measure the pressure and temperature within the autoclave chamber. Such sensors/gauges may provide pressure and temperature data to a controller (e.g., a computer controller) that is configured to automatically adjust the supply of inert gas/supercritical fluid to maintain the desired pressure within the autoclave chamber. In some embodiments, for example, the controller is configured to maintain the pressure and/or temperature in the autoclave chamber to be at least a predetermined target value during the hold time (e.g., a pressure within the range of about 180 bar (18 MPa) to about 200 bar (20 MPa) and a temperature within the range of about 95° C. to about 115° C.). In some embodiments, for example, the controller is configured to maintain the pressure and/or temperature in the autoclave chamber during the hold time to be within plus or minus 10%, plus or minus 5%, or plus or minus 1% of a predetermined target value. In some embodiments, the controller may control an exhaust valve that is configured to vent gas from the autoclave chamber to reduce the pressure within the autoclave chamber as needed. In some embodiments, the controller may also control a gas supply valve to allow for additional gas or supercritical fluid to be introduced into the autoclave chamber to increase the pressure as needed. Moreover, in some embodiments, the controller may also be connected to a temperature control system that is configured to heat or cool the autoclave chamber in response to the sensed temperature to maintain the autoclave chamber at the desired temperature range. The temperature control system may include heating and/or cooling elements for adjusting the temperature within the autoclave chamber.

In some embodiments, pressure is released after the predetermined hold time has passed at step 610. In some embodiments, pressure may be released by venting the gas from the autoclave chamber. For example, the controller may be programmed to open an exhaust valve to allow gas to exit the autoclave chamber and cause a drop in pressure. In some embodiments, the pressure is decreased to about atmospheric pressure. The rate of the pressure drop may be controlled by the controller. In some embodiments, the pressure is dropped rapidly (e.g., in less than 30 seconds, less than 10 seconds, less than five seconds, or less than one second). In other embodiments, the pressure is released more slowly (e.g., over a minute or more). In some embodiments, the pressure is released near instantaneously. In other embodiments, the pressure may be released in a step-wise fashion or gradually.

In some embodiments, as the pressure is released, the supercritical fluid infused into the polymer sheet or block form numerous cell nuclei (e.g., bubbles) in the polymer material. In some embodiments, the drop in pressure causes the supercritical fluid to transition to a gaseous state causing the cell nuclei to expand in volume and foam the polymer sheet or block.

In some embodiments, a counterpressure gas may be injected into the autoclave chamber to control the expansion of the foam. The counterpressure gas may be injected in a sufficient amount to counteract, at least partially, the immediate expansion of the foam when the pressure in the autoclave chamber is released, according to some embodiments. The use of the counterpressure gas, in some embodiments, may help produce a smoother surface on the foam by preventing gas bubbles from breaking through a surface of the foam, for example. In some embodiments, the counterpressure gas may include the same gas as the inert gas/supercritical fluid used to foam the polymer material. For example, in some embodiments, if supercritical $CO_2$ is used to foam the polymer material, $CO_2$ gas may be used as the counterpressure gas, or if supercritical $N_2$ is used to foam the polymer material, $N_2$ gas may be used as the counterpressure gas. In other embodiments, a gas different than the supercritical fluid is used as the counterpressure gas. For example, if supercritical $CO_2$ is used to foam the polymer material, $N_2$ gas or compressed air may be used as the counterpressure gas in certain embodiments. In some embodiments, the dosing amount and pressure of the counterpressure gas may be dynamically controlled based on the sensed pressure within the autoclave chamber (e.g., via one or more pressure sensors). For example, in some embodiments the controller used to maintain the desired pressure and/or temperature within the autoclave chamber may also be configured to control the amount of counterpressure gas that is introduced into the autoclave chamber to counteract the expansion of the foam. The controller may receive data from the one or more pressure sensors and determine the amount of counterpressure gas based on these data.

In some embodiments, under certain conditions such as a relatively higher temperature and lower pressures, the supercritical fluid can cause the polymer to expand and form open-cell foams, where the cells are interconnected and have an open structure. Open-cell foams, for example, have a high surface area and can be useful for applications where high permeability and breathability are required. Under other conditions, such as a relatively lower temperatures and higher pressures, the supercritical fluid can cause the polymer to expand and form closed-cell foams, where the cells are isolated and have a closed structure. Closed-cell foams have low permeability and can be useful, for example, for applications such as non-permeable shoe insoles and midsoles. Therefore, the choice of autoclaving conditions can be used to tailor the cell structure of the foam to the desired application.

After or during the release of pressure, the foamed polymer sheet or block may be allowed to cool (e.g., to room temperature) according to some embodiments. The cooling process may include passive heat dissipation from the autoclave chamber and/or active cooling by the temperature control system. In some embodiments, at step 612, the foamed sheet or block may be removed from the autoclave chamber. In some embodiments, the foamed sheet or block may have dimensions that are in the range of 2 to 3 times greater than the initial dimensions of the un-foamed polymer sheet or block (2× to 3× expansion ratio). Different polymers will have saturate with the inert supercritical fluid differently, and therefore, result in different resulting foam densities. In some embodiments, for example, the resulting foam densities are in the range of 0.1 g/cm³ to 0.13 g/cm³. In some embodiments, the foam densities can be tailored to be in the range of 0.1 g/cm³ to 0.28 g/cm³ depending on the intended end-use of the foam. In some embodiments, typical foam hardnesses can be in the range of 30 Asker C to 50 Asker C, for example, between 35 Asker C and 45 Asker C.

In some embodiments, the foamed sheet or block, at step 614, may then be optionally shaped for a desired purpose (e.g., cut to desired size/shape, compressed, rolled, etc.). For example, in some embodiments, the foam may be shaped into shoe components (e.g., shoe insoles or midsoles). In other embodiments, the foam may be shaped into seat cushions or other foam products. In some embodiments, where pre-formed sheets or pre-formed blocks are utilized, the foam may already have a shape that generally matches the desired shape of the finished foam product. Nonetheless, the foam may still be subjected to buffing, deburring, sanding, or other surface finishing processes as appropriate. Optionally, the foam may be subjected to a compression molding process. In some embodiments, for example, the autoclaved foam is placed into a heat compression mold in the temperature range of about 120° C. to about 200° C., e.g., between 140° C. and 160° C., for one to several minutes, before cooling to approximately room temperature. This process slightly reduces the surface area of the foamed part and increases the density of the foam. As a non-limiting example, the foamed part may have had an expansion ratio of 2× during the autoclave process, and the compression molding may reduce the expansion ratio to 1.5×. The density of the foam may be increased by the compression molding process, with a density of approximately 12.5% higher in some embodiments.

Figure 8:
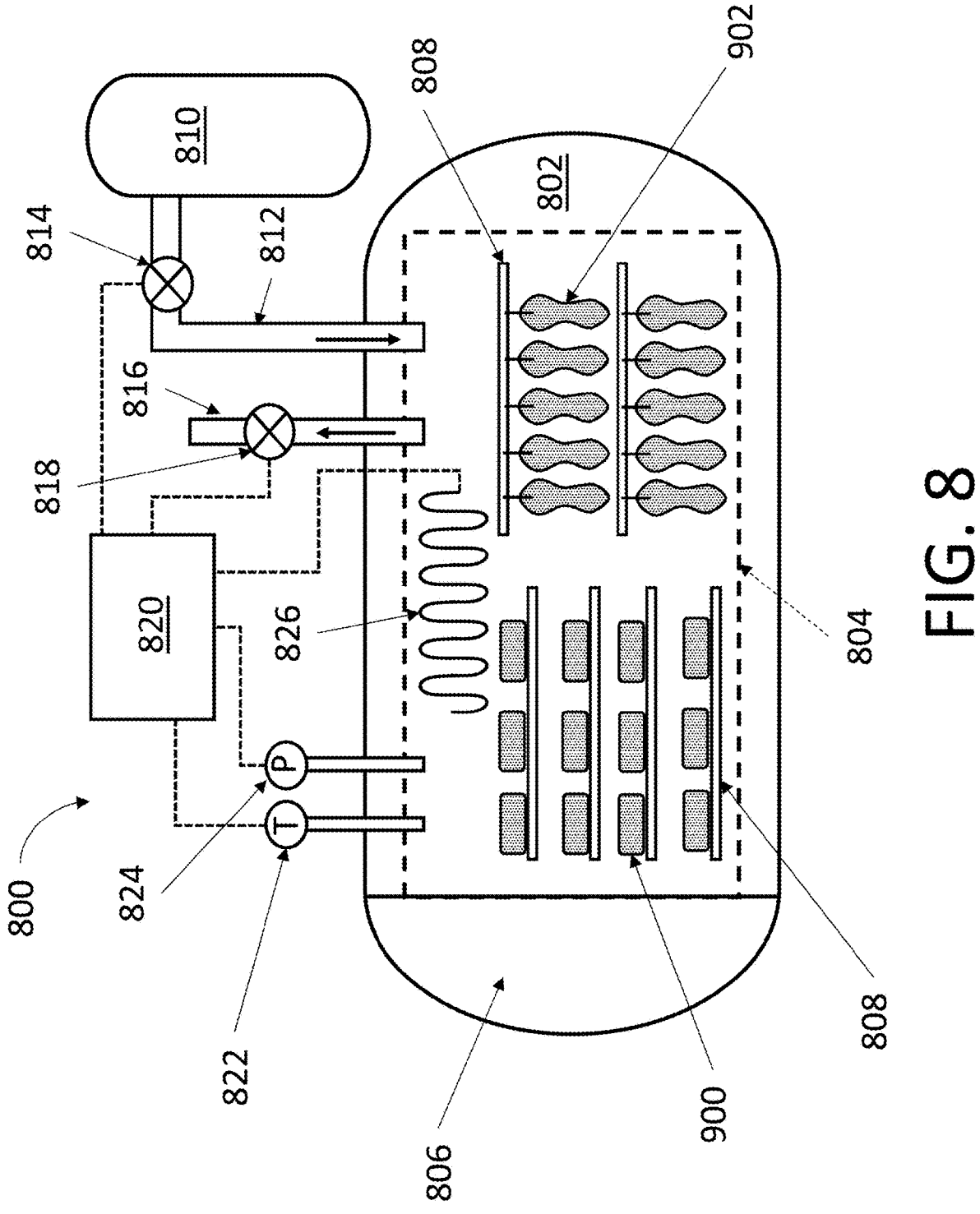
FIG. 8 is a diagram illustrating an autoclave system for producing foams according to some embodiments of the present disclosure.

In some embodiments, the autoclave chamber may be sufficiently sized to accommodate several polymer sheets or blocks at the same time. For instance, the autoclave chamber may include a series a shelves or racks for the placement of separate polymer sheets or blocks that can be expanded simultaneously in a single process. FIG. 8 is a simplified diagram illustrating an autoclave system 800 that may be used to produce foams in accordance with embodiments described in the present disclosure, for example, in processes 500 and/or 600. In some embodiments, autoclave system 800 includes an autoclave 802 having an interior autoclave chamber 804 that may be sealed or opened by way of autoclave door 806. One or more racks 808 may be arranged within autoclave chamber 804 to hold one or more polymer sheets or blocks 900. The racks 808 should be sufficiently spaced apart to accommodate for the expansion of the polymer sheets or blocks 900. Moreover, in some embodiments, the racks 808 may be movable relative to autoclave 802 such that, for example, they may be moved into and out of autoclave chamber 804 to facilitate introduction of the polymer sheets or blocks 900 into autoclave chamber 804. In some embodiments, polymer sheets or blocks 900 are formed by an extrusion process, e.g., as described in any of the previous embodiments. In some embodiments, the polymer sheets or blocks may include or consist of one or more pre-formed sheets or pre-formed blocks 902. As discussed in prior embodiments, pre-formed sheets or pre-formed blocks 902 may have a pre-formed shaped that is similar to but smaller than the desired finished foam products. For example, in some embodiments, pre-formed sheets or pre-formed blocks 902 may be shaped like shoe components, e.g., as shown as pre-formed block 702 of FIG. 7. In some embodiments, pre-formed sheets or pre-formed blocks 902 are formed by injection molding as described previously. In some embodiments, pre-formed sheets or pre-formed blocks 902 are suspended from racks 808. In some embodiments, suspending pre-formed sheets or pre-formed blocks 902 may increase the exposed amount of surface area and facilitate saturation by the supercritical fluid. Polymer sheets or blocks 900, including pre-formed sheets or pre-formed blocks 902, may comprise or consist of any of the recyclable, biodegradable, and/or compostable thermoplastic polymers discussed above (e.g., PEBA, polyamide, PBAT, biodegradable branched polyester, or other aliphatic-aromatic polyester). In some embodiments, polymer sheets or blocks 900, including pre-formed sheets or pre-formed blocks 902, do not contain any cross-linked polymers.

In some embodiments, autoclave system 800 further includes one or more gas supplies 810. Gas supply 810 is configured to supply an inert gas to the autoclave chamber, for example, via gas supply line 812. The inert gas, as discussed, may include nitrogen gas, carbon dioxide, or a mixture thereof according to some embodiments. Where the inert gas includes a mix of different gases, each gas may be supplied via a separate gas supply 810. Each gas supply 810, for example, may include one or more pressurized gas cylinders or other gas sources used in the art. Gas supply 810 and/or gas supply line 812 may include a valve 814 that is configured to control the input of the inert gas from gas supply 810 to autoclave chamber 804. In some embodiments, a controller 820 is used to control the opening/closing of valve 814.

In further embodiments, autoclave system 800 includes at least one exhaust line 816 that is configured to allow gas to exit autoclave chamber 804. In some embodiments, pressure in autoclave chamber 804 may be reduced by allowing gas to exit via exhaust line 816. In some embodiments, exhaust line 816 may be opened or closed via an exhaust valve 818. In some embodiments, operation of exhaust valve 818 may also be controlled by controller 820. While not shown, exhaust line 816 in some embodiments may be connected to a gas collection/recycling system in order to capture gas that is vented from autoclave chamber 804.

In some embodiments, autoclave system 800 includes at least one heating element 826 configured to heat the temperature within autoclave chamber 804 during the autoclave process. Heating element 826 may include, for example, a heating coil or other heat source used in the art suitable for achieving the desired temperature ranges (e.g., about 95° C. to about 115° C.). In some embodiments, the at least one heating element 826 may be controlled by controller 820. In further embodiments, autoclave system 800 may also include a cooling system (not shown) that is configured to decrease the temperature of autoclave chamber 804. The cooling system may include, for example, a water heat exchanger or cooling jacket.

Controller 820, in some embodiments, is a computer controller that is configured to control the operation of one or more elements of autoclave system 800. As discussed, controller 820 may be configured to control operation of gas valve 814, exhaust valve 818, and/or heating element 826 to regulate and/or maintain the pressure, temperature, and hold time within autoclave chamber 804 during the autoclave foaming process. In some embodiments, controller 820 controls operation of these features in response to receiving at least autoclave chamber temperature data and pressure data. Such data may be determined by one or more temperature sensors 822 and one or more pressure sensors 824. In some embodiments, the one or more temperature sensors 822 and one or more pressure sensors 824 are configured to provide real-time or nearly real-time temperature and pressure data to controller 820. In some embodiments, the one or more temperature sensors 822 and one or more pressure sensors 824 are configured to provide data to controller 820 at regular intervals (e.g., once per minute). In some embodiments, the temperature and pressure data may be compared to preset target values (e.g., by computer processors within controller 820) and if the sensed data deviates from the target values beyond a predetermined amount, controller 820 causes actuation of one or more of the gas valve 814, exhaust valve 818, and/or heating element 826. For example, if the sensed pressure within autoclave chamber 804 is lower than the preset target pressure range, controller 820 may cause gas valve 814 to open to allow more gas to be supplied within autoclave chamber 804 to increase the pressure. If the sensed pressure within autoclave chamber 804 is higher than the preset target pressure range, controller 820 may cause exhaust valve 818 to open to allow gas to exit autoclave chamber 804 via exhaust line 816. Similarly, controller 820 may be configured to cause heating element 826 to activate if the sensed temperature is below a present target temperature.

In other embodiments, the autoclave chamber may be sized such that a single foamed sheet or block substantially fills the entirety of the autoclave chamber as the cell nuclei expand. In some such embodiments, the autoclave chamber may act as a mold cavity such that the walls of the autoclave chamber impart a desired shape and/or size to the foamed sheet or block as it expands to fill the autoclave chamber.

In some embodiments, methods of the present disclosure may generally include the steps of placing a solid polymer sheet or block into a high-pressure resistance mold cavity, closing and sealing the mold cavity, heating the mold cavity (e.g., to about 100° C. to about 160° C.), introducing a supercritical fluid (e.g., supercritical $N_2$ or supercritical $CO_2$) into the mold cavity, and causing the supercritical fluid to be rapidly diffused into the solid polymer sheet or block at a high temperature and a high pressure (e.g., from about 90 bar to about 200 bar), and, after the supercritical fluid reaches a sufficient hold time, rapidly (e.g., instantaneously) releasing the pressure of the supercritical fluid inside the mold cavity such that the solid polymer sheet or block inside the mold cavity expands and grows until substantially filling the mold cavity volume.

In some embodiments, heating the mold cavity includes heating the mold cavity to a predetermined temperature. The predetermined temperature may be, for example, greater than the critical temperature of the supercritical fluid. In some embodiments, the high pressure within the mold cavity is obtained by pressurizing the mold cavity with a sufficient amount of the supercritical fluid to reach the desired pressure. The desired pressure may be, for example, greater than the critical pressure of the supercritical fluid. In some embodiments, the mold cavity may be rapidly opened to allow the foamed sheet or block to continue to expand outside the mold cavity. In still further embodiments, the mold cavity may be cooled (e.g., about 90° C. to about 130° C.) just prior to or simultaneously with the release of the pressure of the supercritical fluid.

In some embodiments, the mold cavity is configured as an autoclave chamber, e.g., as described above. In some embodiments, the mold cavity is formed between an upper mold and a lower mold which, for example, can be clamped together (e.g., via hydraulic or pneumatic clamps) after placement of the solid polymer sheet or block and rapidly unclamped to open. In some such embodiments, one or both of the upper mold and lower mold may be provided with at least one inlet valve for the introduction of the supercritical fluid and at least one exhaust valve for the rapid and instantaneous release of the supercritical fluid from the mold cavity.

The hold time, according to some embodiments, may be selected to be sufficient for the diffusion of the supercritical gas into the solid polymer sheet or block to reach equilibrium. For example, the hold time may range from less than one minute to greater than thirty minutes, for example, depending on factors such as the size of the polymer sheet or block and type of supercritical gas used. In some embodiments, the hold time may be greater than thirty minutes, greater than sixty minutes, at least 120 minutes, at least 180 minutes, at least 240 minutes, at least 300 minutes, or at least 360 minutes depending on conditions. In other embodiments, the hold time may be less than 15 minutes, less than 10 minutes, or less than five minutes. In some embodiments, the hold time is between one minute and five minutes, between one minute and 10 minutes, between one minute and 15 minutes, between one minute and 30 minutes, or between one minute and 60 minutes. In some embodiments, the hold time is between 60 minutes to 120 minutes. In some embodiments, the hold time is between 120 minutes to 180 minutes. In some embodiments, the hold time is between 180 minutes to 240 minutes. In some embodiments, the hold time is between 240 minutes to 300 minutes. In some embodiments, the hold time is between 300 minutes to 360 minutes.

As with other embodiments, the initial solid polymer sheet or block may be formed by extrusion, injection molding, or other process described herein, and may be formed from any of the recyclable, biodegradable, and/or compostable thermoplastic polymers discussed above (e.g. PEBA, polyamide, PBAT, biodegradable branched polyester, or other aliphatic-aromatic polyester). The polymer sheet or block is preferably un-crosslinked and remains un-crosslinked through the entire foaming process according to some embodiments. The size of the initial solid polymer sheet or block may be selected such that, for example, the mold cavity has a volume that is about 1.1 to about 5 times the volume of the initial solid polymer sheet or block. The solid polymer sheet or block may expand to fill substantially the entire volume of the mold cavity according to some embodiments such that, for example, the expanded foam has a volume within the mold cavity that is about 1.1 to about 5 times the volume of the initial solid polymer sheet or block. In some embodiments, the foam may continue to expand outside of the mold cavity after being released from the mold cavity. In such embodiments, the expanded foam may obtain a final volume before cutting and shaping that is greater than the volume of the mold cavity. The expanded foam may be formed into a desired shape by the mold cavity in some embodiments. In some embodiments, the foam may be further cut or shaped as needed following removal from the mold cavity.

As described herein, the foams manufactured in accordance with embodiments of the present disclosure may be useful in a variety of industries and end products, for example, but not limited to, footwear components (e.g., shoe insoles or midsoles), seating components, protective gear components, vehicle components, bedding materials, and watersport accessories. In some embodiments, the extruded foams of the present disclosure may be formed in a variety of predetermined dimensions (e.g., thicknesses, lengths, widths), depending on the intended application. In further embodiments, the foams may subsequently be cut or shaped (e.g. via compression molding) for forming foam pieces useful for making the end products. For example, a sheet of a biodegradable and/or recyclable foam made in accordance with embodiments of the present disclosure may be die-cut into a usable piece that may be referred to as a "blocker." The blocker may then be compression molded to form, for instance, a contoured footwear midsole for use in assembling shoes or other footwear.

Because foams according to certain embodiments are made from recycled, recyclable, biodegradable, and/or compostable materials, without cross-linking, the foams offer an environmentally-friendly alternative to conventional foam materials (e.g., EVA or TPU foams). At the end of the foam's usable life, the foam can either be optionally biodegraded or composted, in the case of the biodegradable foam, or be recycled and reprocessed (e.g., into new foam) in the case of a recyclable foam. In some embodiments, the foams can be depolymerized back into useable pre-cursor ingredients (e.g., monomers), thanks to the lack of crosslinking agents or other impeding chemical additives.

It should be understood that various changes, substitutions, and alterations can be made herein without departing from the spirit and scope of the invention as defined by the appended claims. It should also be apparent that individual elements identified herein as belonging to a particular embodiment may be included in other embodiments of the invention. Moreover, the scope of the present application is not intended to be limited to the particular embodiments of the process, machine, manufacture, and composition of matter, means, methods and steps described in the specification. As one of ordinary skill in the art will readily appreciate from the disclosure herein, processes, machines, manufacture, composition of matter, means, methods, or steps, presently existing or later to be developed that perform substantially the same function or achieve substantially the same result as the corresponding embodiments described herein may be utilized according to the present invention.

What is claimed is:

1. A process for producing foam shoe components, the process comprising:
  introducing a plurality of polymer sheets or blocks into an autoclave chamber, each of the polymer sheets or blocks having a pre-formed shape of a shoe component and comprising one or more non-cross-linked thermoplastic polymers that are biodegradable;
  pressurizing the autoclave chamber to an elevated pressure;
  maintaining the elevated pressure within the autoclave chamber for sufficient time to infuse a supercritical fluid into the polymer sheet or block;
  reducing the pressure within the autoclave chamber to cause the infused supercritical fluid to form cell nuclei throughout the polymer sheets or blocks; and
  allowing the cell nuclei to expand to form a foam shoe component from each of the polymer sheets or blocks within the autoclave chamber,
  wherein the foam shoe components comprise a closed-cell foam.

2. The process of claim 1, further comprising producing the polymer sheets or blocks by an extrusion process prior to introducing the polymer sheets or blocks into the autoclave chamber.

3. The process of claim 2, wherein the extrusion process comprises:
  feeding pellets of the one or more non-cross-linked thermoplastic polymers into an extruder;
  compressing and melting the pellets in the extruder to form a polymer melt; and
  extruding the polymer melt through a die.

4. The process of claim 3, wherein the extrusion process further comprises:
  cooling the polymer melt after the polymer melt exits the die for form a solid polymer extrudate; and
  cutting the solid polymer extrudate to form the polymer sheets or blocks in the pre-formed shape.

5. The process of claim 4, wherein the extrusion process further comprises passing the solid polymer extrudate between rollers to flatten the solid polymer extrudate prior to cutting the solid polymer extrudate.

6. The process of claim 1, further comprising producing the polymer sheets or blocks by an injection molding process prior to introducing the polymer sheets or blocks into the autoclave chamber.

7. The process of claim 6, wherein the injection molding process comprises:
  forming a molten polymer from pellets of the one or more non-cross-linked thermoplastic polymers;
  injecting the molten polymer into a mold having a predetermined shape and size of the pre-formed shape of the shoe component; and
  cooling the molten polymer to solidify the polymer into the polymer sheet or block having the predetermined shape and size of the mold.

8. The process of claim 7, wherein the foam shoe components have dimensions that are 2 to 3 times the dimensions of the size of the mold.

9. The process of claim 1, wherein the foam shoe components are shoe midsoles.

10. The process of claim 1, wherein pressurizing the autoclave chamber to the elevated pressure comprises introducing a sufficient amount of the supercritical fluid into the autoclave chamber to obtain the elevated pressure.

11. The process of claim 1, wherein pressurizing the autoclave chamber to the elevated pressure comprises introducing an inert gas into the autoclave chamber and converting the inert gas into the supercritical fluid in the autoclave chamber.

12. A process for producing a foam shoe component, the process comprising:
  placing a polymer sheet or block into a mold cavity, the polymer sheet or block having a pre-formed shape of a shoe component and comprising one or more non-cross-linked thermoplastic polymers that are biodegradable;
  closing and sealing the mold cavity;
  heating the mold cavity to a predetermined temperature;
  introducing a sufficient amount of supercritical fluid into the mold cavity to pressurize the mold cavity;
  allowing the supercritical fluid to diffuse into the polymer sheet or block for a predetermined amount of time; and
  after the predetermined amount of time, releasing the pressure inside the mold cavity such that the polymer sheet or block expands inside the mold cavity.

13. The process of claim 12, wherein the polymer sheet or block expands to substantially fill the mold cavity.

14. The process of claim 12, wherein predetermined amount of time is sufficient for the diffusion of the supercritical gas into solid polymer sheet or block to reach equilibrium.

15. The process of claim 12, wherein the predetermined temperature greater than the critical temperature of the supercritical gas.

16. The process of claim 12, wherein the polymer sheet or block is an extruded polymer sheet or block.

17. The process of claim 12, further comprising producing the polymer sheet or block by an extrusion process or injection molding process prior to placing the polymer sheet or block into the mold cavity.

18. The process of claim 12, further comprising cooling the mold cavity prior to or simultaneously with releasing the pressure inside the mold cavity.

19. The process of claim 1, wherein the supercritical fluid comprises supercritical $CO_2$, supercritical $N_2$, or a mixture thereof.

20. The process of claim 1, wherein the supercritical fluid is supercritical $N_2$.

21. The process of claim 1, wherein the one or more non-cross-linked thermoplastic polymers comprises a polymer selected from the group consisting of: polylactic acid (PLA), poly(L-lactic acid) (PLLA), poly(butylene adipate-co-terephthalate) (PBAT), polycaprolactone (PCL), polyhydroxy alkanoate (PHA), polyhydroxybutyrate (PHB), polybutylene succinate (PBS), polybutylene succinate adipate (PBSA), polybutylene adipate (PBA), thermoplastic starch (TPS), and a blend containing one or more thereof.

22. The process of claim 1, wherein the one or more non-cross-linked thermoplastic polymers comprises poly(butylene adipate-co-terephthalate) (PBAT).

23. The process of claim 1, wherein the one or more non-cross-linked thermoplastic polymers consists of poly(butylene adipate-co-terephthalate) (PBAT).

24. The process of claim 1, wherein the one or more non-cross-linked thermoplastic polymers comprises a bio-derived polymer.

25. The process of claim 1, wherein the one or more non-cross-linked thermoplastic polymers comprises a branched polyester.

26. The process of claim 1, wherein the one or more non-cross-linked thermoplastic polymers comprises one or more aliphatic-aromatic polyesters selected from the group consisting of: poly(1,4-butylene adipate-co-1,4-butylene terephthalate), poly(1,4-butylene sebacate-co-1,4-butylene terephthalate), poly(1,4-butylene azelate-co-1,4-butylene terephthalate), poly(1,4-butylene brassylate-co-1,4-butylene terephthalate), poly(1,4-butylene succinate-co-1,4-butylene terephthalate), poly(1,4-butylene adipate-co-1,4-butylene sebacate-co-1,4-butylene terephthalate), poly(1,4-butylene azelate-co-1,4-butylene sebacate-co-1,4-butylene terephthalate), poly(1,4-butylene adipate-co-1,4-butylene azelate-co-1,4-butylene terephthalate), poly(1,4-butylene succinate-co-1,4-butylene sebacate-co-1,4-butylene terephthalate), poly(1,4-butylene adipate-co-1,4-butylene succinate-co-1,4-butylene terephthalate), poly(1,4-butylene azelate-co-1,4-butylene succinate-co-1,4-butylene terephthalate), poly(1,4-butylene azelate-co-1,4-butylene succinate-co-1,4-butylene adipate-co-1,4-butylene terephthalate), poly(1,4-butylene azelate-co-1,4-butylene succinate-co-1,4-butylene sebacate-co-1,4-butylene terephthalate), poly(1,4-butylene azelate-co-1,4-butylene succinate-co-1,4-butylene brassylate-co-1,4-butylene terephthalate), poly(1,4-butylene azelate-co-1,4-butylene succinate-co-1,4-butylene adipate-co-1,4-butylene sebacate-co-1,4-butylene terephthalate), poly(1,4-butylene azelate-co-1,4-butylene succinate-co-1,4-butylene adipate-co-1,4-butylene brassylate-co-1,4-butylene terephthalate), poly(1,4-butylene azelate-co-1,4-butylene succinate-co-1,4-butylene brassylate-co-1,4-butylene sebacate-co-1,4-butylene terephthalate), and poly(1,4-butylene azelate-co-1,4-butylene succinate-co-1,4-butylene adipate-co-1,4-butylene sebacate-co-1,4-butylene brassylate-co-1,4-butylene terephthalate).

27. The process of claim 1, wherein the foamed shoe components have dimensions that are about 2 to about 3 times the dimensions of the pre-formed shape of the shoe component.

28. The process of claim 1, wherein the polymer sheets or blocks have a density within a range of 1.0 $g/cm^3$ to about 1.4 $g/cm^3$, and wherein the foamed shoe components have a density within a range of 0.1 $g/cm^3$ to 0.28 $g/cm^3$.

* * * * *